US008005597B2

(12) United States Patent
Bolton et al.

(10) Patent No.: US 8,005,597 B2
(45) Date of Patent: Aug. 23, 2011

(54) SYSTEM AND METHOD FOR SEAT BELT CONTROL

(75) Inventors: Todd Bolton, Auburn Hills, MI (US); Fred Momblanco, Auburn Hills, MI (US); Susan Yi Song, Grosse Pointe Farms, MI (US); Jeff Bennett, Auburn Hills, MI (US); Mohannad Murad, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/947,670

(22) Filed: Nov. 16, 2010

(65) Prior Publication Data

US 2011/0148176 A1 Jun. 23, 2011

Related U.S. Application Data

(62) Division of application No. 11/701,530, filed on Feb. 2, 2007, now Pat. No. 7,869,921.

(60) Provisional application No. 60/743,231, filed on Feb. 3, 2006.

(51) Int. Cl.
*B60R 22/44* (2006.01)
*B60R 22/48* (2006.01)
(52) U.S. Cl. ............ 701/45; 180/268; 280/807
(58) Field of Classification Search .......... None
See application file for complete search history.

(56) References Cited

U.S. PATENT DOCUMENTS

| 4,966,394 | A | * | 10/1990 | Thomas et al. ............ 280/807 |
| 6,282,473 | B1 | | 8/2001 | Steffens, Jr. |
| 6,685,124 | B2 | | 2/2004 | Frank |
| 2002/0024211 | A1 | | 2/2002 | Yano et al. |
| 2004/0089758 | A1 | | 5/2004 | Bullinger et al. |
| 2004/0251367 | A1 | | 12/2004 | Suzuki et al. |
| 2005/0073187 | A1 | | 4/2005 | Frank et al. |
| 2005/0082815 | A1 | | 4/2005 | Frank et al. |
| 2005/0252710 | A1 | | 11/2005 | Akaba et al. |

(Continued)

FOREIGN PATENT DOCUMENTS

DE 102004001480 A1 * 8/2005

(Continued)

OTHER PUBLICATIONS

Office Action in U.S. Appl. No. 11/701,530 dated Mar. 12, 2010.

(Continued)

*Primary Examiner* — Michael J. Zanelli
(74) *Attorney, Agent, or Firm* — Foley & Lardner LLP

(57) ABSTRACT

A system is provided for utilizing belt movement information in a motorized seat belt (MSB) control system algorithm to achieve better levels of comfort and safety. The MSB control system algorithm controls execution of multiple modes including a no friction mode, a stowage mode, a slack reduction mode, an out of position warning mode, a medium pull-back mode, and a high pull-back mode. The MSB control system algorithm also controls execution of a low power mode initiated after the other vehicle modules are put to sleep to provide the ability to stow the seat belt after the vehicle has been turned off for some period of time. The MSB control system algorithm also controls belt monitoring functions defined based on a buckle switch state that indicates the buckled or unbuckled state of the seat belt. Belt monitoring consists of belt movement being converted to counts based on a resolution provided by a belt movement sensor.

10 Claims, 17 Drawing Sheets

U.S. PATENT DOCUMENTS

| | | |
|---|---|---|
| 2006/0157968 A1 | 7/2006 | Kitazawa |
| 2007/0090224 A1 | 4/2007 | Ng et al. |
| 2007/0095963 A1 | 5/2007 | Yukinori et al. |

FOREIGN PATENT DOCUMENTS

| | | |
|---|---|---|
| EP | 1 498 325 A1 | 1/2005 |
| EP | 1 593 562 A1 | 11/2005 |
| EP | 1 671 860 A1 | 6/2006 |
| GB | 2410593 A * | 8/2005 |
| WO | WO-2005/051732 A1 | 6/2005 |

OTHER PUBLICATIONS

Notice of Allowance in U.S. Appl. No. 12/947,677 dated May 17, 2011.

Office Action in U.S. Appl. No. 12/959,278 dated May 6, 2011.

* cited by examiner

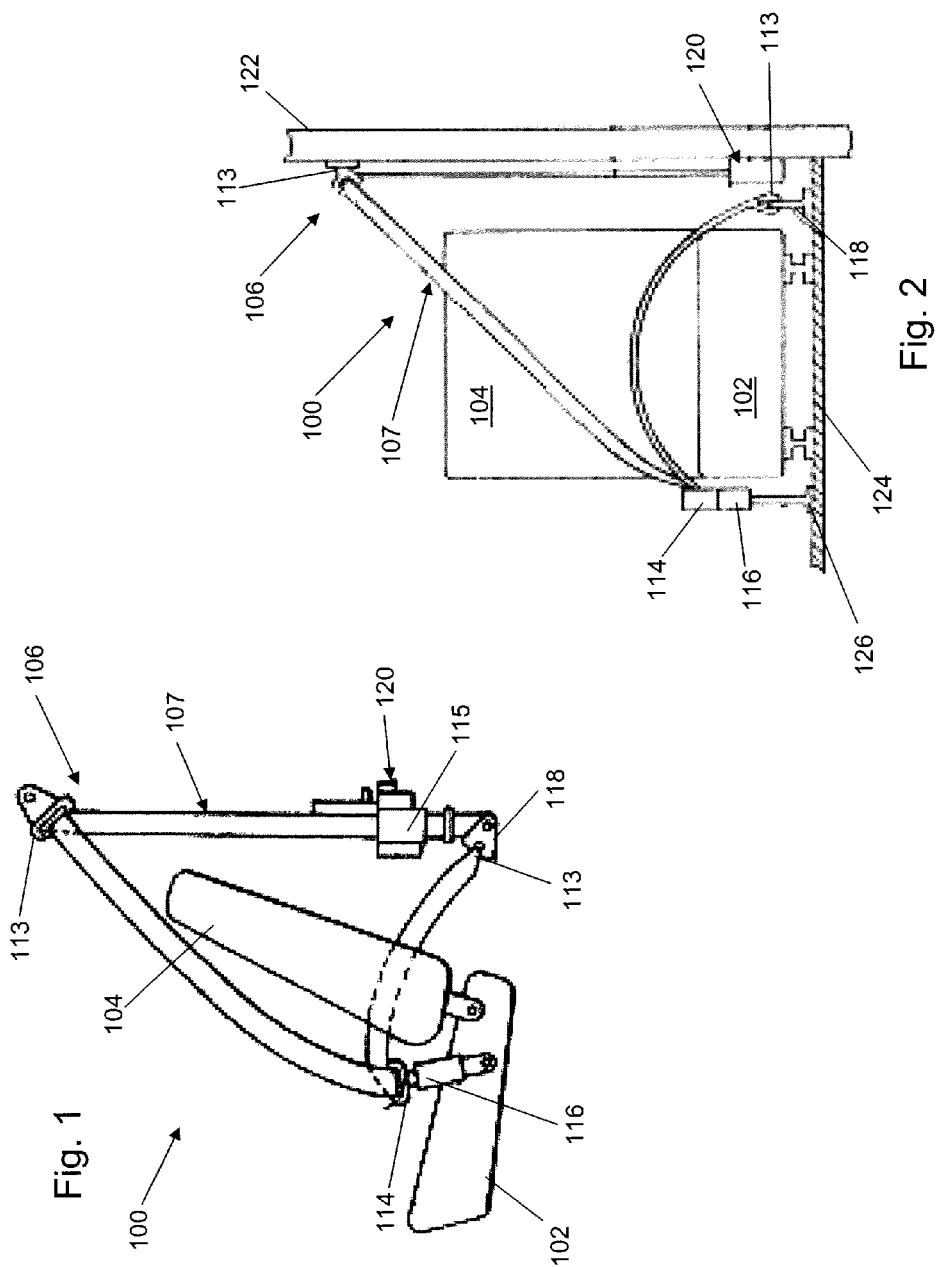

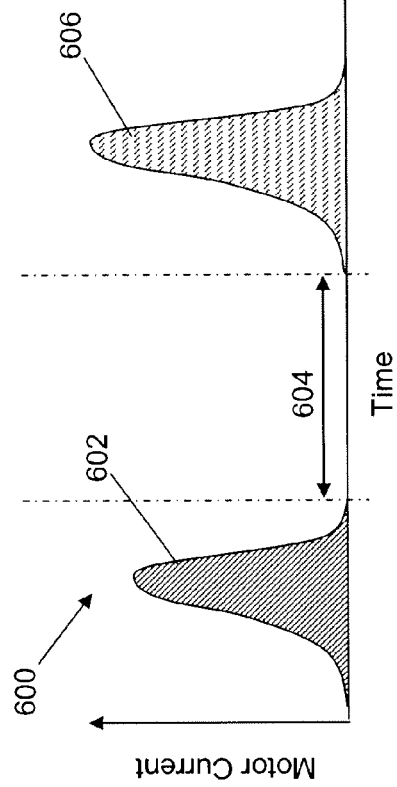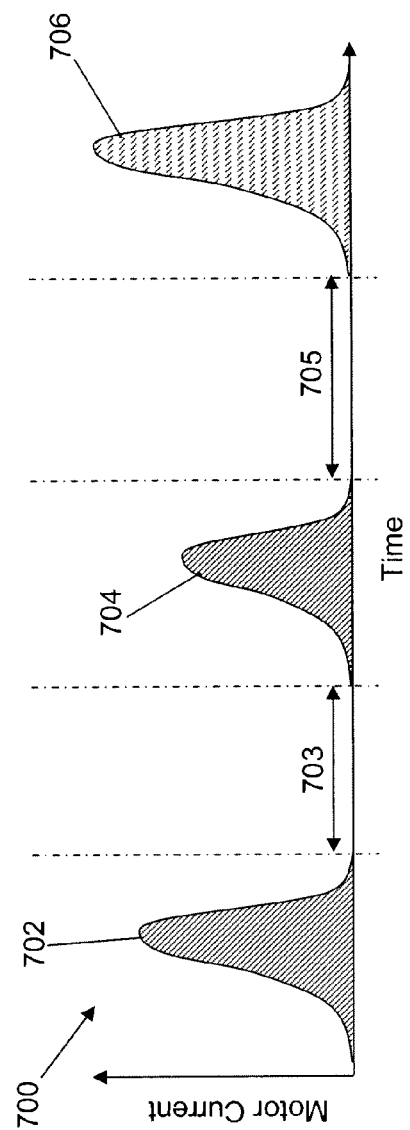

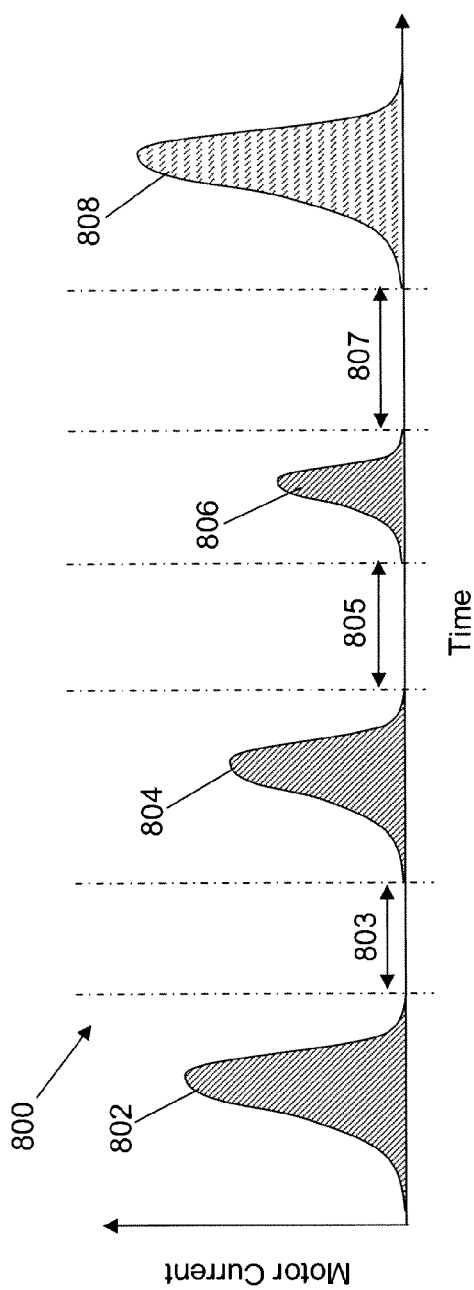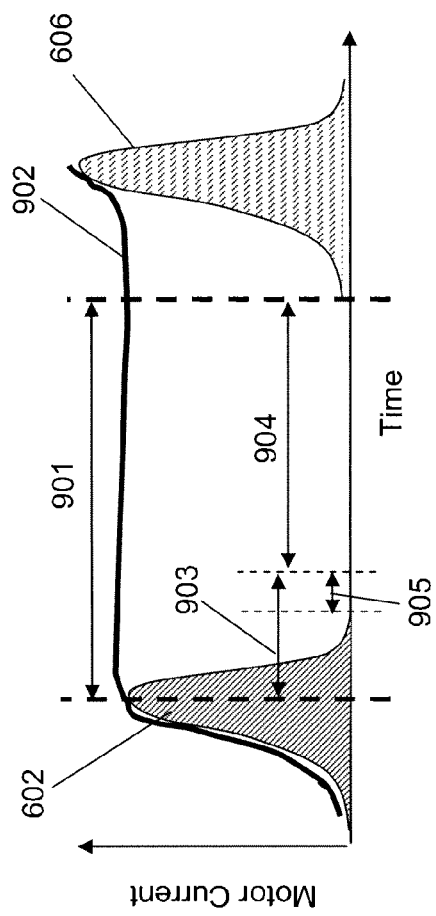

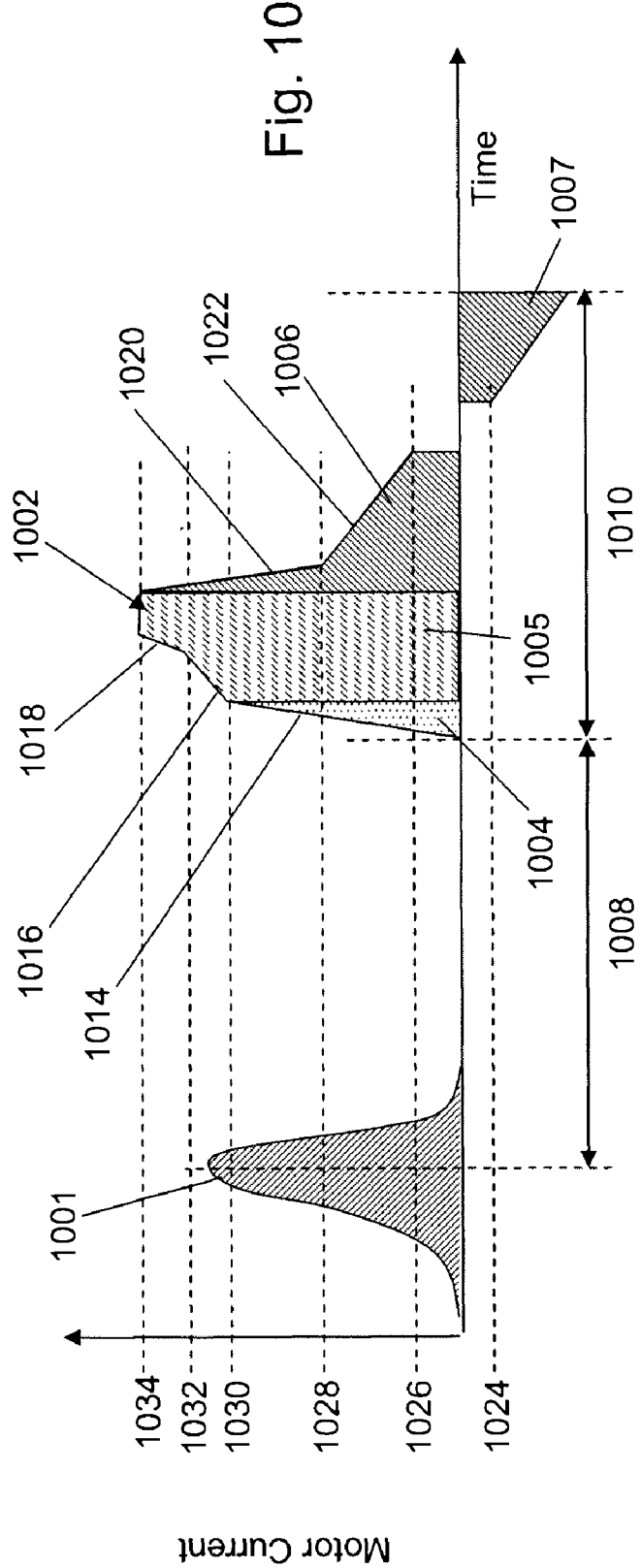

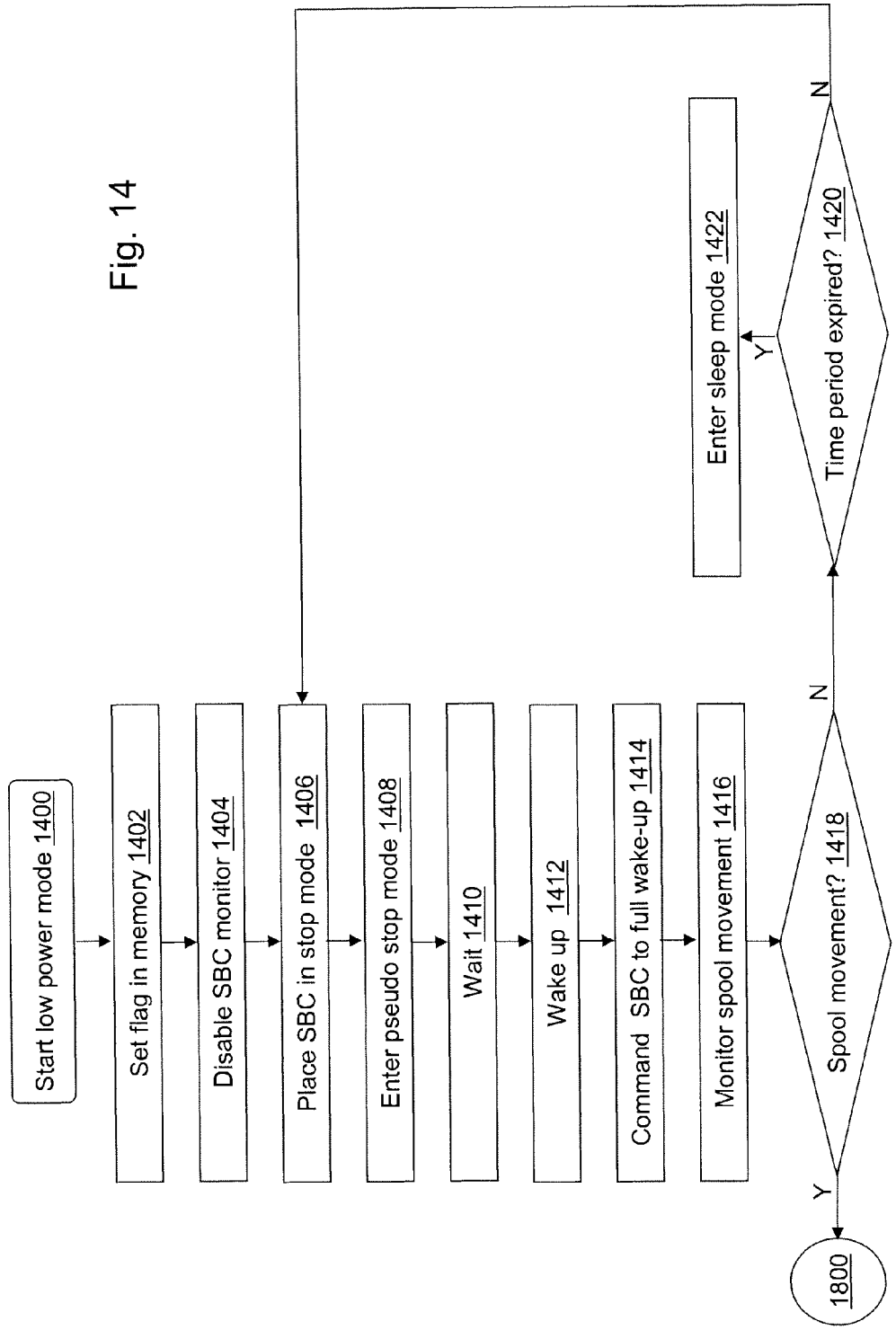

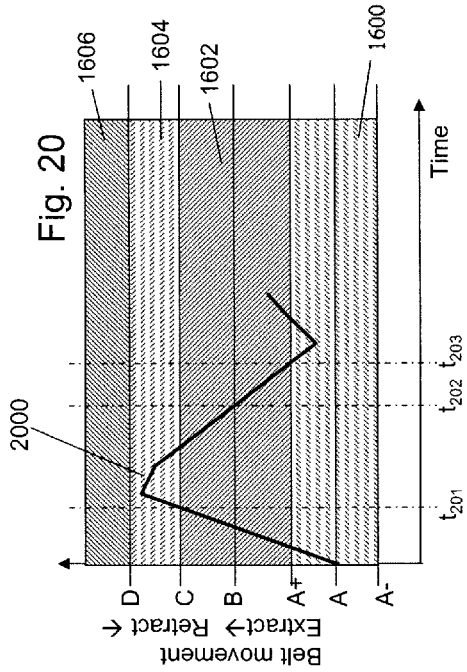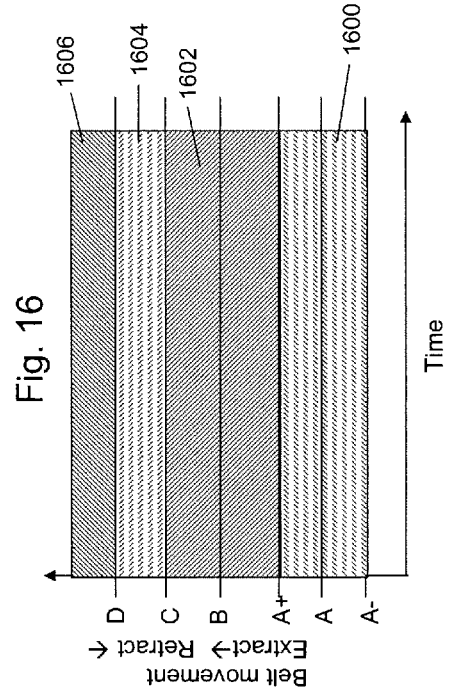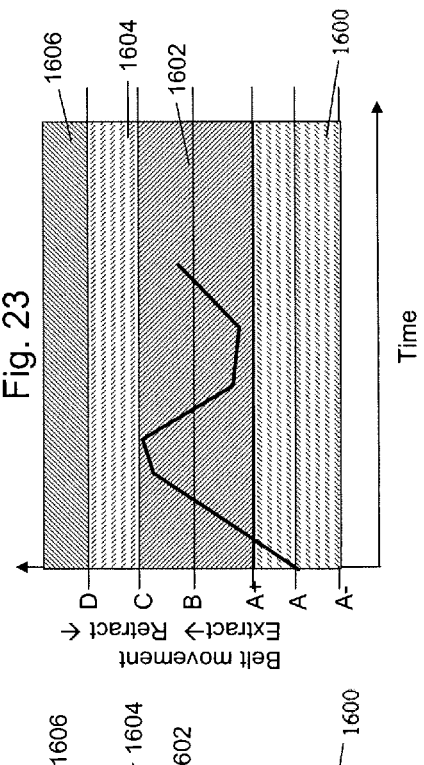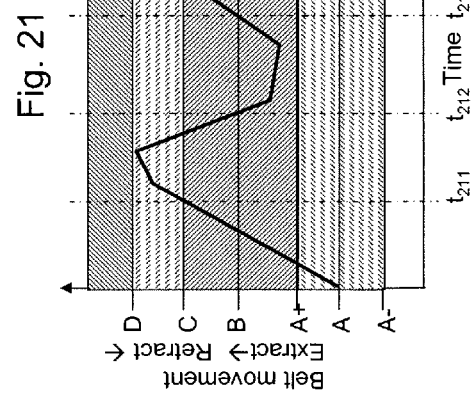

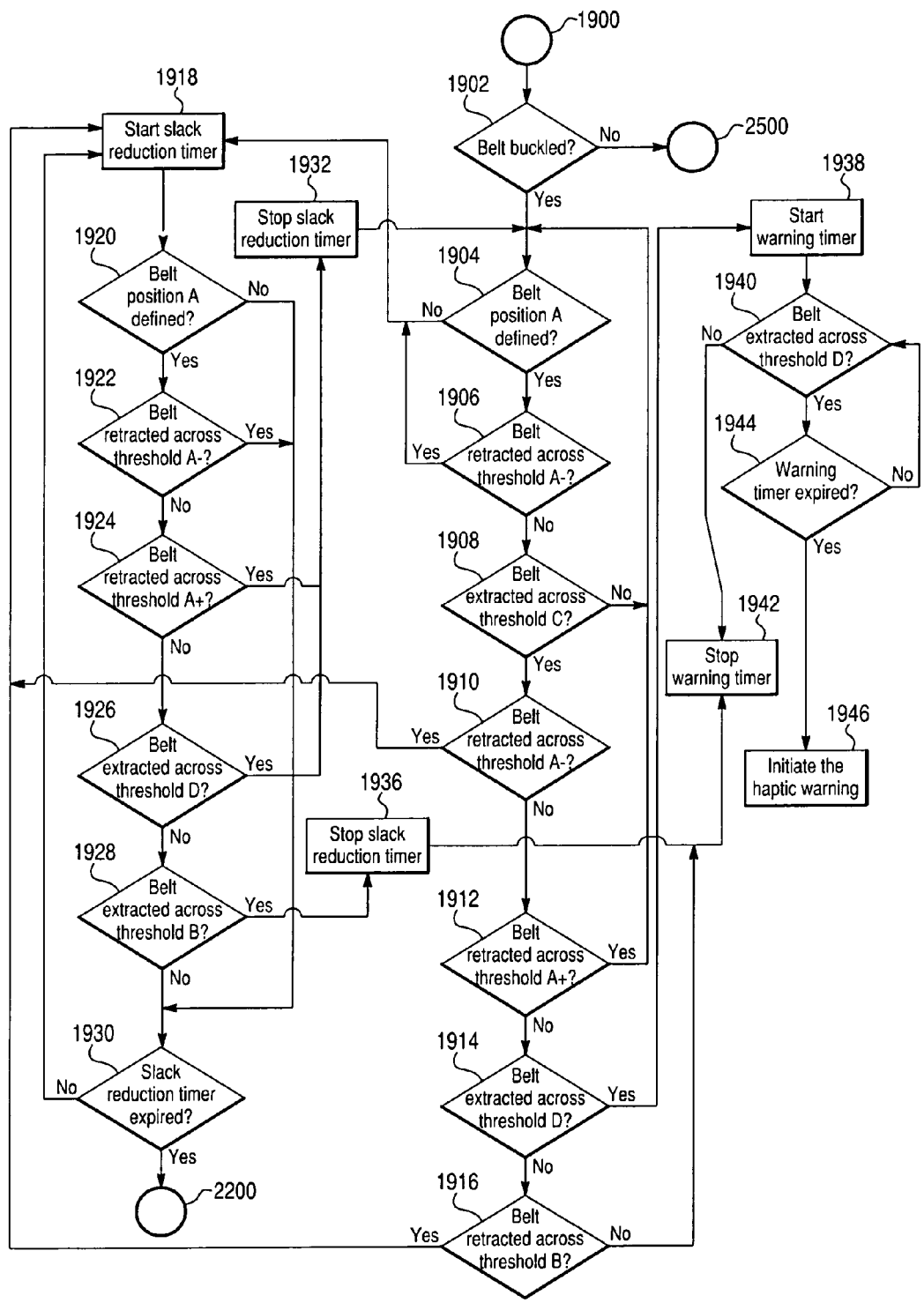

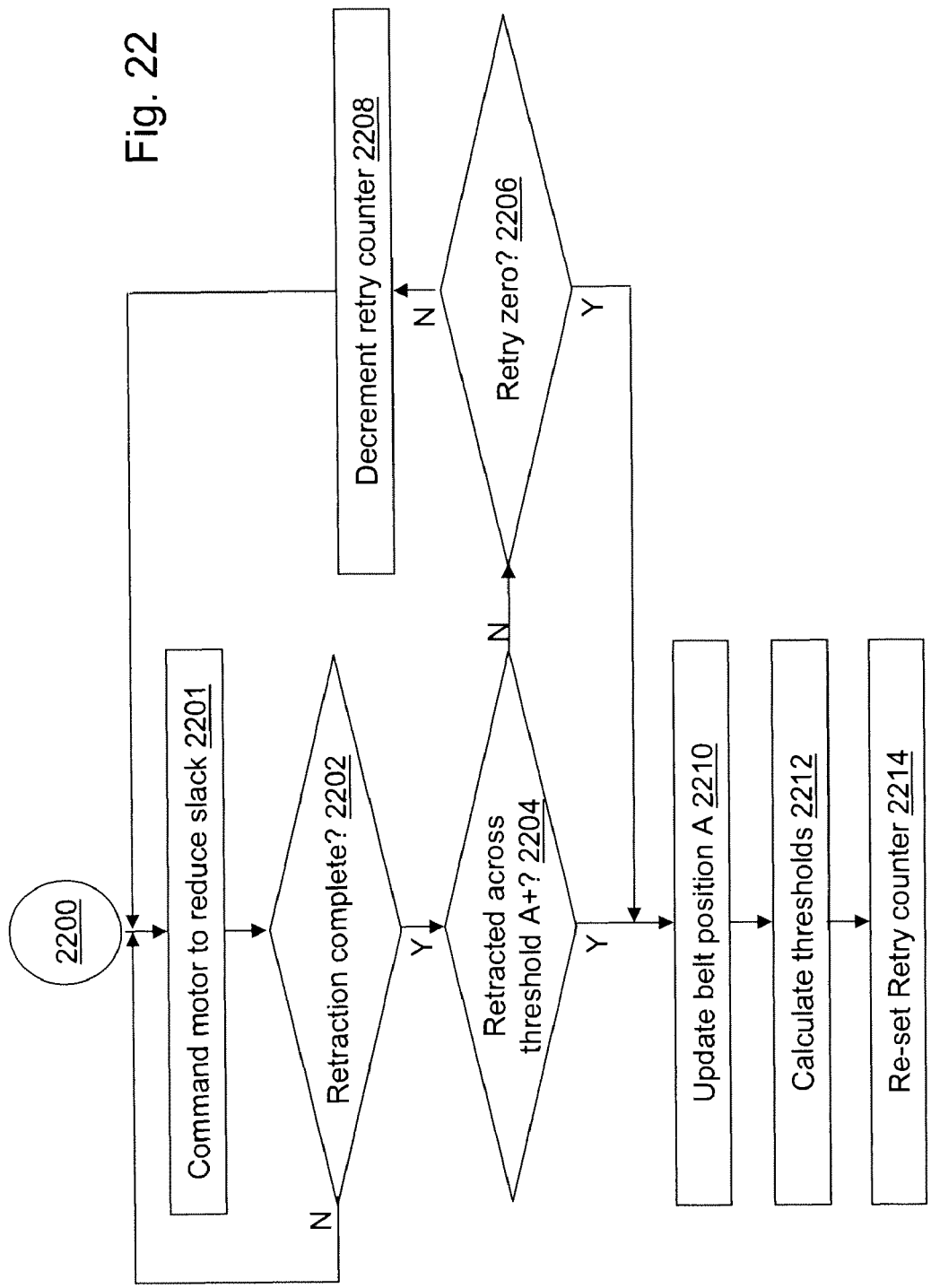

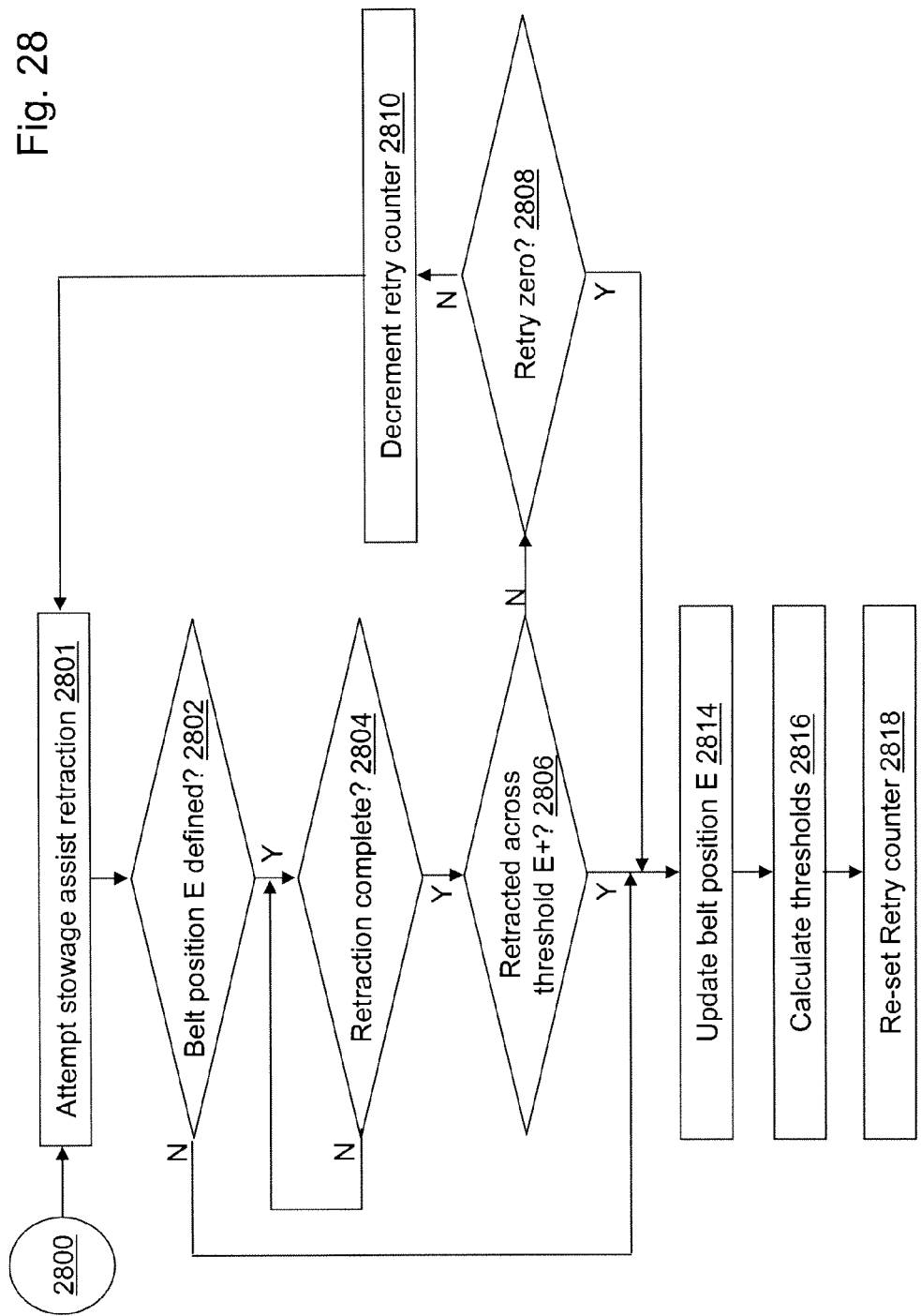

SYSTEM AND METHOD FOR SEAT BELT CONTROL

RELATED APPLICATIONS

This application is a Divisional of U.S. application Ser. No. 11/701,530, filed Feb. 2, 2007, which is based upon and claims the benefit of U.S. Provisional Patent Application No. 60/743,231, filed on Feb. 3, 2006, and titled "A SYSTEM AND METHOD FOR SEAT BELT CONTROL," the disclosure of which is incorporated herein by reference in its entirety.

FIELD OF THE INVENTION

The subject of the disclosure relates generally to a vehicle safety system. More specifically, the disclosure relates to a safety restraint system having a seat belt retractor driven by a motor and controlled by an electronic control unit.

BACKGROUND OF THE INVENTION

A vehicle generally contains automatic safety restraint devices activated during a vehicle crash to reduce occupant injury. The safety of the occupant of a vehicle during a crash depends upon whether or not the occupant is using the safety restraint system, and, if so, whether or not the system is properly adjusted. Examples of automatic safety restraint devices include air bags, seat belt pretensioners, and deployable knee bolsters. A more effective safety restraint system controls the deployment force of airbags and the pretension of seatbelts based on detected characteristics of the seat occupant such as the size of the seat occupant. For example, when an adult is seated on the vehicle seat, the airbag can be deployed in a normal manner; however, if a small child is seated on the seat, the airbag either should not be deployed or should be deployed with a lower deployment force. Sensors of various types are placed at locations in and around the vehicle to detect situational characteristics both inside the vehicle and outside the vehicle. The information from the sensors is input into one or more control unit that controls the function of the safety restraint devices.

Restraint systems such as motorized seat belt (MSB) retractors have become standard equipment in modern automobiles. MSB retractors are widely used to protect passengers from the impact produced during a vehicle collision. Prior to a collision involving the vehicle, the MSB actuates a seat belt to protect the passenger. The MSB could be deployed because there are indications of an impending collision (an emergency situation), based for example on a severe breaking or swerving of the vehicle or external sensor systems that predict a high probability of a collision or of a potential rollover. The MSB could also be deployed at low force levels for comfort related reasons. As a result, the motor control of the MSB may have two basic types of modes, comfort mode and safety mode.

A MSB retractor includes a motor, typically electric, that operates to retract the seat belt in case of an emergency or to assist in the extraction or retraction when a passenger enters or exits the vehicle. The operation of the motor may be controlled by a signal generated by a microprocessor. A control system algorithm and the associated logic are needed to define the different safety and comfort modes that the MSB control unit is designed to fulfill. Such an algorithm should receive multiple sources of information available from various sensors such as a buckle status sensor, a seat track position sensor, a belt movement sensor, etc, and should utilize the information to improve the comfort level and the safety level of the vehicle occupant.

SUMMARY OF THE INVENTION

An exemplary embodiment of the invention provides a system and a method for utilizing belt movement information in a motorized seat belt (MSB) control system algorithm to achieve better levels of comfort and safety. For example, the MSB control system algorithm controls execution of multiple modes including a no friction mode, a stowage mode, a slack reduction mode, an out of position (OOP) warning mode, a medium pull-back mode, and a high pull-back mode. The pull-back modes may include multiple pull-back attempts to pull back the occupant in the situation where the occupant has their hand between the belt and torso causing continuous belt movement and a failure to lock the retractor. Each pull-back stage may be followed by a hold stage and ultimately a release stage. The release stage may be characterized by calibrateable ramp up and ramp down periods including a de-clutch period to comfortably release the occupant while minimizing the power required by the motor.

Additionally, the MSB control system algorithm includes a low power mode functionality to reduce the amount of power required to maintain the responsiveness of the control system. The MSB control system algorithm initiates the low power mode after the other vehicle modules are put to sleep. The purpose of the low power mode is to provide the ability to stow the seat belt after the vehicle has been turned off for some period of time. The retraction is needed to prevent a limp seat belt from being in the way of an occupant entering or exiting the vehicle. The low power mode is also needed when the occupant remains buckled for some period of time during which the vehicle control system enters a full sleep mode, and the occupant subsequently unbuckles the seat belt. Using the low power mode, the MSB control system has the capability to wake up and assist the occupant in stowing the belt.

The MSB control system algorithm also controls belt monitoring functions defined based on a buckle switch state that indicates the buckled or unbuckled state of the seat belt. Belt monitoring consists of belt movement being converted to counts based on a resolution provided by a sensor. The sensor data is processed to determine whether the MSB control system should initiate a slack reduction, occupant warning, stowage assist, pull-back, etc. Such decisions are determined based on the belt monitoring zone and the retraction/extraction movement of the seat belt.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements. The objects shown in the figures may not be drawn to the same scale.

FIG. 1 depicts a side view of a first safety restraint system in accordance with an exemplary embodiment.

FIG. 2 depicts a front view of a second safety restraint system in accordance with an exemplary embodiment.

FIG. 6 illustrates a first motor current response having a single pull-back stage in accordance with an exemplary embodiment.

FIG. 7 illustrates a second motor current response having two pull-back stages in accordance with an exemplary embodiment.

FIG. 8 illustrates a third motor current response having three pull-back stages in accordance with an exemplary embodiment.

FIG. 9 illustrates the first motor current response of FIG. 6 including an indication of the characteristics of the hold stage in accordance with an exemplary embodiment.

FIG. 10 illustrates the first motor current response of FIG. 6 including an indication of the characteristics of the release stage in accordance with an exemplary embodiment.

FIG. 14 is a flow diagram illustrating exemplary operations of the first exemplary low power mode in accordance with an exemplary embodiment.

FIG. 16 illustrates monitoring zones of movement of a buckled belt in accordance with an exemplary embodiment.

FIG. 19 is a flow diagram illustrating exemplary operations in monitoring a buckled seat belt of the MSB control system in accordance with an exemplary embodiment.

FIG. 20 illustrates a first exemplary sequence of movement of the seat belt relative to the monitoring zones of FIG. 16 in accordance with an exemplary embodiment.

FIG. 21 illustrates a second exemplary sequence of movement of the seat belt relative to the monitoring zones of FIG. 16 in accordance with an exemplary embodiment.

FIG. 22 is a flow diagram illustrating exemplary operations in slack reduction of a buckled seat belt of the MSB control system in accordance with an exemplary embodiment.

FIG. 23 illustrates a third exemplary sequence of movement of the seat belt relative to the monitoring zones of FIG. 16 in accordance with an exemplary embodiment.

FIG. 28 is a flow diagram illustrating exemplary operations in stowage assistance of an unbuckled seat belt of the MSB control system in accordance with an exemplary embodiment.

DETAILED DESCRIPTION OF EXEMPLARY EMBODIMENTS

Figure 3:
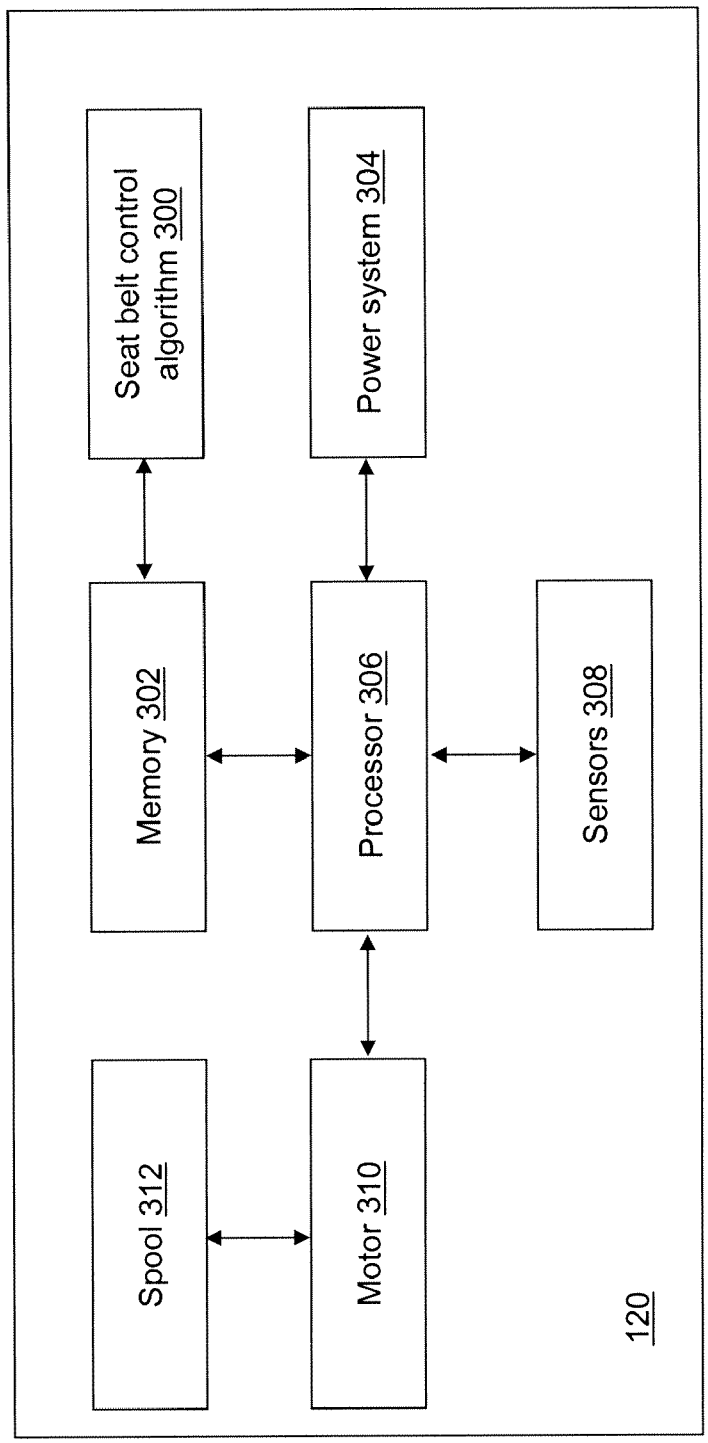
FIG. 3 is a block diagram illustrating functional components of a motorized seat belt (MSB) control system in accordance with an exemplary embodiment.

With reference to FIG. 1, a safety restraint system 100 is shown. Safety restraint system 100 includes a bottom seat cushion 102, a back seat cushion 104, and an exemplary motorized seat belt (MSB) system 106. Exemplary MSB system 106 is of the three-point type and includes a seat belt 107 and a MSB control system 120. Some or all of MSB control system 120 may be located a distance from the seat belt 107. Seat belt 107 has a first end 113 mounted to a bottom wall 124 of a vehicular body at a first anchorage 118 and a second end mounted to a retractor contained within a retractor body 115. The retractor includes a spool about which at least a portion of the seat belt 107 is wound for retraction and extraction movement. Thus, seat belt 107 is movable between the first end 113 and the second end at the retractor. A shoulder anchor 113 is mounted to a wall 122 (shown with reference to FIG. 2) of the vehicular body on the same side as that of first anchorage 118 as viewed from the front of the vehicle and shown with reference to FIG. 2. Shoulder anchor 113 includes a guide to allow movement of the seat belt 107 therethrough. A tongue 114 is movably fitted to an intermediate portion of seat belt 107 and includes a guide that allows movement of the seat belt 107 therethrough. Tongue 114 removably engages a buckle 116 mounted to bottom wall 124 at a second anchorage 126. When the tongue 114 is engaged with buckle 116, seat belt 107 is in a buckled state. When the tongue 114 is disengaged from buckle 116, seat belt 107 is in an unbuckled state. A sensor may be mounted in buckle 116 and/or tongue 114 to detect the state of seat belt 107.

In use, a passenger pulls seat belt 107 out from the retractor and engages tongue 114 with buckle 116. As a result, seat belt 107 extends across the shoulder and waist of the passenger. In the buckled state, if a collision occurs, seat belt 107 holds the passenger in the seat, the basic mechanics of which are known to those skilled in the art. For example, a collision sensor detects a high probability of a collision and sends a collision signal to MSB control system 120. In response, a pretensioner mechanism begins retraction of seat belt 107. Seat belt 107 contacts the waist and the upper part of the body of the passenger and, as a result, undergoes a load that causes a clamp mechanism to clamp seat belt 107 thereby holding seat belt 107 in place. As a result, the passenger is restrained with an appropriate force.

With reference to FIG. 3, functional components of the MSB control system 120 are shown. In an exemplary embodiment, MSB control system 120 includes a seat belt control algorithm 300, a memory 302, a power system 304, a processor 306, sensors 308, a motor 310, and a spool 312. Seat belt control algorithm 300 is an organized set of instructions that, when executed, cause MSB system 106 to comfortably and safely restrain the passenger. Seat belt control algorithm 300 may be written using one or more programming language, assembly language, scripting language, etc.

Memory 302 stores seat belt control algorithm 300 in addition to other information. Memory technologies include, but are not limited to, random access memory, read only memory, flash memory, etc. Power system 304 provides power to the various components of MSB control system 120 and may be a battery. Processor 306 executes instructions that may be written using one or more programming language, scripting language, assembly language, etc. The instructions may be carried out by a special purpose computer, logic circuits, or hardware circuits. Thus, processor 306 may be implemented in hardware, firmware, software, or any combination of these methods. The term "execution" is the process of carrying out the operation called for by an instruction. Processor 306 executes seat belt control algorithm 300 and/or other instructions.

MSB control system 120 may have one or more processors and one or more memories that use the same or different implementing technologies. Seat belt control algorithm 300 may be implemented in a single module or may be distributed among multiple modules. The components of MSB control system 120 may be housed separately or together and may interface using a network. Components communicating in a network are connected by communication paths that may be wired or wireless. For example, MSB control system 120 can be triggered via a message from an interface BUS system. The information required to trigger control system 120 may be carried over a communications bus, such as a controller area network (CAN) bus. In an exemplary embodiment, the CAN bus is a high-integrity serial data communications bus typically used for real-time applications that can operate at rates up to 1 Megabits per second.

Sensors 308 detect conditions of MSB system 106. For example, a first sensor may detect the buckled or unbuckled state of seat belt 107. As another example, a seat belt tension sensor may be used to monitor for a withdraw tension of seat belt 107. A withdraw tension is a tension in seat belt 107 that is indicative of an occupant's attempt to withdraw the lap belt manually. Other sensors detect movement of spool 312 about which a portion of seat belt 107 retracts. Still other sensors detect movement of the seat belt 107 to determine a direction and/or a speed of the movement. Yet other sensors may detect the weight of the passenger to determine a more optimal deployment of the seat belt pretensioners of MSB system 106.

Motor 310 of the seat belt retractor may be used to drive spool 312 in both the withdrawal (extraction) direction and the retraction direction. In general, the motor 310 is electric and is operated to rotate spool 312 of the seat belt retractor in the withdrawal direction in response to the tension sensor indicating a tension in seat belt 107 of at least the withdraw tension. When the tension in seat belt 107 drops below the withdraw tension, motor 310 is stopped. When motor 310 is used to drive spool 312 in both the withdrawal direction and the retraction direction, the motor 310 is a reversible motor.

The motor control can be divided into six major modes which can be classified under two main types of modes, comfort and safety. Comfort modes include no friction mode and stowage mode. In no friction mode, no friction is placed on seat belt 107 to impede its movement. In stowage mode, MSB control system 120 acts to assist the passenger in fully stowing seat belt 107 after use.

Safety modes include slack reduction mode, out of position (OOP) warning mode, medium pull-back mode, and high pull-back mode. Safety modes can be initiated when MSB control system 120 is receiving full information from the user interface bus. In general, the full information is received when the vehicle has been started, MSB control system 120 is fault free, and the occupant is buckled into safety restraint system 100. The vehicle engine may be any of gas, hybrid, electric, etc. without limitation. In slack reduction mode, any slack in seat belt 107 after buckling is removed. Additionally, any extra slack which may be generated by an occupant leaning forward and then sitting back or by an occupant moving the seat backwards also may be removed. In OOP warning mode, the occupant is out of position in the seat in some manner. In OOP warning mode, a configurable number quick pull backs on the seat belt may be generated by MSB control system 120 to warn the occupant when the occupant is out of position for a configurable period of time. For example, the occupant may bend forward in the seat to pick something up from the floor of the vehicle. In medium pull-back mode, MSB control system 120 operates to tighten seat belt 107 to hold the occupant comfortably in the seat. In high pull-back mode, MSB control system 120 operates to strongly pull the occupant back in the seat in anticipation of a crash event.

Figure 4:
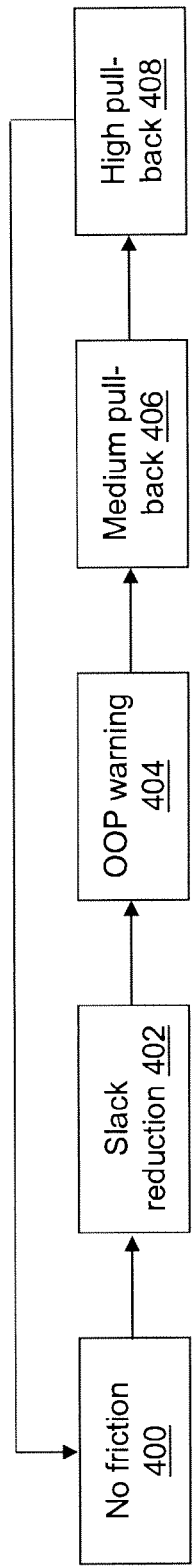
FIG. 4 is a block diagram illustrating a mode sequence executed in anticipation of a collision event in accordance with an exemplary embodiment.

The pull-back modes consist of three main types of stages: pull-back stages (primary, secondary, and tertiary); hold stages; and a release stage. A pull-back user interface command of MSB control system 120 indicates two types of release strategies: 1) release based on a user interface command; and 2) release based on a hold timer expiration. With reference to FIG. 4, an exemplary sequence of mode progression is shown indicating a progression from no friction mode 400, to slack reduction mode 402 after movement of the occupant, to OOP warning mode 404 after significant movement of the occupant, to medium pull-back mode 406, to high pull-back mode 408 after detection of a collision event.

Figure 5:
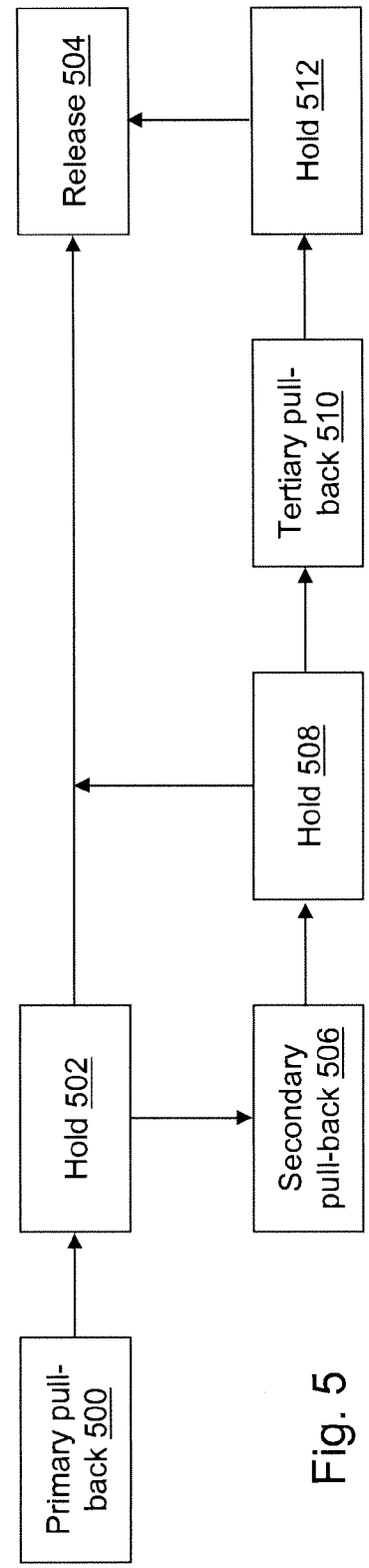
FIG. 5 is a block diagram illustrating a high pull-back mode sequence executed in anticipation of a collision event in accordance with an exemplary embodiment.

With reference to FIG. 5, an exemplary sequence of stages is shown for executing either high pull-back mode 408 or medium pull-back mode 406. A primary pull-back stage 500 is initiated based on a safety control command received over the user interface bus. The purpose of primary pull-back stage 500 is to first pull the occupant back in the seat and then to maintain the tension in belt system 107 keeping the occupant in the seat position. The release strategy could be based either on receipt of a release command or due to expiration of a hold timer. During a hold stage 502, the retractor is locked and waiting for a release pulse to transition to release stage 504. The retractor may be locked, for example, using a mechanical lock or by maintaining a motor current. If during hold stage 502, an unlocked retractor is sensed, for example, based on slack in the belt system 107, a secondary pull-back stage 506 is initiated to remove the slack in order to lock the retractor again. During a hold stage 508, the retractor is locked and waiting for a release pulse to transition to release stage 504. If an unlocked retractor is still sensed, a tertiary pull-back stage 510 is initiated. During a hold stage 512, the retractor is locked and waiting for a release pulse to transition to release stage 504. High pull-back mode 408, for example, occurs if the occupant had his hand between seat belt 107 and his torso causing continuous belt movement upon withdrawal of the hand after primary pull-back stage 500 ends, which did not permit the retractor to lock or caused slack in the seat belt. In such scenarios, the need to initiate secondary pull-back stage 506 or tertiary pull-back stage 510 arises. Hold stages 502, 508, 512 may have the same characteristics such as motor tension, duration, etc. or may be different.

Hold stages 502, 508, 512 are terminated when a release command is receive from the user interface bus or the hold timer expires. After completion of release stage 504, the motor control exits high pull-back mode and returns to no friction mode 400. For systems where belt monitor sensing and a retractor mechanical locking control system are not available, secondary pull-back stage 506 or tertiary pull-back stage 510 may not be available. An exemplary retractor mechanical locking control system is a solenoid controlled pawl. In these systems, only primary pull-back stage 500 may be applied.

With reference to FIG. 6, a first motor current response 600 is shown for a primary pull-back stage 500, hold stage 502, and release stage 504 execution. MSB control system 120 sends a command to motor 310 to initiate a primary pull-back pulse 602, which transitions into a hold period 604. Hold period 604 ends at a time determined based on the release strategy which, for example, may be a received release command or expiration of a hold timer. At the termination of hold period 604, motor 310 initiates a release pulse 606.

With reference to FIG. 7, a second motor current response 700 is shown for a primary pull-back stage 500, hold stage 502, secondary pull-back stage 506, hold stage 508, and release stage 504 execution. MSB control system 120 sends a command to motor 310 to initiate a primary pull-back pulse 702, which transitions into a hold period 703. Hold period 703 ends at a time determined based on the release strategy which, for example, may be a received release command or expiration of a hold timer. At the termination of hold period 703, motor 310 may initiate a secondary pull-back pulse 704 if belt slack exists, which transitions into a hold period 705. Hold period 705 ends at a time determined based on the release strategy which, for example, may be a received release command or expiration of a hold timer. At the termination of hold period 705, motor 310 initiates a release pulse 706.

With reference to FIG. 8, a third motor current response 800 is shown for a primary pull-back stage 500, hold stage 502, secondary pull-back stage 506, hold stage 508, tertiary pull-back stage 510, hold stage 512, and release stage 504 execution. MSB control system 120 sends a command to motor 310 to initiate a primary pull-back pulse 802, which transitions into a hold period 803. Hold period 803 ends at a time determined based on the release strategy which, for example, may be a received release command or expiration of a hold timer. At the termination of hold period 803, motor 310 may initiate a secondary pull-back pulse 804 if belt slack exists. Secondary pull-back pulse 804 transitions into a hold period 805. Hold period 805 ends at a time determined based on the release strategy which, for example, may be a received release command or expiration of a hold timer. At the termination of hold period 805, motor 310—may initiate a tertiary pull-back pulse 806 if belt slack exists. Tertiary pull-back pulse 806 transitions into a hold period 807. Hold period 807 ends at a time determined based on the release strategy which, for example, may be a received release command or expiration of a hold timer. At the termination of hold period 807, a release pulse 808.

With reference to FIG. 9, characteristics of hold stage 502 are shown. Hold stage time period 901 extends from the peak of primary pull-back pulse 602 to the initiation of release pulse 606. Hold stages 502, 508, 512 are entered after finishing the respective pull-back stage 500, 506, 510. A first time period 903 is a calibrate-able delay period during which MSB control system 120 continues to energize the solenoid as an attempt to lock the retractor and to guarantee an engaged pawl of the spool Continuing to energize the solenoid protects in the scenario where the solenoid is activated for a period of time, but, because the occupant is moving backward and the motor current is still high and trying to move the belt monitor in the retraction direction, the pawl disengages and the retractor becomes unlocked. The solenoid is energized during first time period 903 determined to guarantee locking during such bounce back conditions.

Belt monitoring includes sensing of belt movement and the conversion of the sensed belt movement to "counts" based on the resolution provided by the belt movement sensor. Thus, a "count" indicates an amount of belt movement based on the resolution provided by the belt movement sensor. The sensor data is processed to determine whether seat belt control algorithm 300 should initiate a slack reduction, an occupant warning, a stowage assist, etc. Such decisions are determined based on a determination of a belt monitoring zone and decision logic described with reference to FIGS. 18, 22, 25, 27, and 28.

A second time period 904 represents the time period that starts immediately after first time period 903. During second time period 904, MSB control system 120 assumes that the retractor is locked. Once the retractor is locked, and during second time period 904 both the retractor and the hardware sensing mechanism are designed to guarantee that any extraction of seat belt 107 does not generate more than a first number of counts, for example, three counts. After the retractor is locked, and during second time period 904 both the retractor and the hardware sensing mechanism are designed to guarantee that moving a second number of counts in the retraction direction results in a free spool or unlocked retractor. During second time period 904, if the first number of consecutive counts in the extraction direction or the second number of consecutive counts in the retraction direction are detected, a free spool or unlocked retractor is identified, and a secondary pull-back pulse 704, 804 (or tertiary pull-back pulse 806) is initiated as shown with reference to FIGS. 7 and 8. Line 902 indicates a tension on seat belt 107 during the pull-back, hold, and release stages. A third time period 905 extends from the start of hold stage 604 until the end of first time period 903.

With reference to FIG. 10, characteristics of release pulse 606, 706, 808 are shown. One of primary pull-back pulse 602, secondary pull-back pulse 704, or tertiary pull-back pulse 806 are indicated as pull-back pulse 1001. Hold period 1008 extends from the peak of pull-back pulse 1001 to initiation of a release pulse 1002. The primary objective of release pulse 1002 is to release the locked retractor smoothly without causing any "pull" feeling to the occupant. In order to release a locked retractor, the spool rotates in a retraction direction, and the motor current may be higher than the maximum current produced during any previous pull-back stage. For this reason, the release pulse is designed to have a quick ramp up of the motor current to a level near the motor current levels achieved during pull-back pulse 1001 before release of the pawl. At the initiation of release pulse 1002, a first motor current response period 1004, includes a ramp up of the motor current level to a first motor current level 1030 during which no belt retraction is expected. First motor current level 1030 is a calibrate-able percentage of the maximum motor current level produced during pull-back pulse 1001. In an exemplary embodiment, the percentage is 90%. A first slope 1014 of the ramp up of the motor current level to first motor current level 1030 is calibrate-able to provide an approximate step shape without too much discomfort to the seat occupant. Approximating a step reduces the amount of energy consumed by the system during first motor current response period 1004. If the hardware senses the first number of consecutive counts in the extraction direction or the second number of consecutive counts in the retraction direction, the retractor is assumed to be unlocked and the remainder of release pulse 1002 is cancelled and a declutch pulse follows.

After achieving first motor current level 1030, a second motor current response period 1005 ramps up to near a maximum motor current level. The pawl is primarily released during second motor current response period 1005 due to spool retraction. Second motor current response period 1005 includes a first ramp up to a second motor current level 1032. A second slope 1016 of the ramp up of the motor current level to second motor current level 1032 is calibrate-able. The second slope 1016 generally is smaller than first slope 1014 because the occupant is expected to feel the release during this phase. Second motor current response period 1005 includes a second ramp up to a third motor current level 1034 that is a maximum motor current level. A third slope 1018 of the ramp up of the motor current level to third motor current level 1034 is calibrate-able. A switch to third slope 1018 occurs at second motor current level 1032 if release of the pawl has not been sensed. The third slope 1018 generally is larger than second slope 1016 because greater motor torque is expected from a more pronounced change in the motor current. For example, third slope 1018 may be a step. Alternatively, under conditions wherein a maximum motor current always releases a retractor at second slope 1016, third slope 1018 can be set to the same value as second slope 1016 for improved comfort by preventing a second pull feeling on the occupant. The motor current level remains at the maximum motor current for a calibrate-able delay period to guarantee that the pawl has been disengaged. The period may be set to zero to reduce the amount of energy consumed by the system during the ramp up portion.

After completion of second motor current response period 1005, a third motor current response period 1006 ramps down to a fourth motor current level 1028 based on a calibrate-able fourth slope 1020. During third motor current response period 1006, the occupant is released slowly. Without such a controlled release, the occupant could experience an abrupt release. After achieving fourth motor current level 1028, a second ramp down to a fifth motor current level 1026 based on a calibrate-able fifth slope 1022 occurs. Fifth motor current level 1026 is determined to avoid bringing the motor current below a certain level because the occupant may move the motor in the extraction direction such that the motor begins working as a generator. A calibrate-able delay period follows until the motor current is reversed to declutch the motor. The calibrate-able delay period is designed to allow a released occupant to continue to relax their body in the extraction direction while still maintaining the spool in the clutched state. A clutched spool has more friction in the gear system than a declutched spool. The more friction provides benefits because it slows down an occupant's extraction process. Otherwise, if a declutch is performed too soon after the release pulse, the initial force may cause the occupant to "jerk" forward. After the delay period, a fourth motor current response period 1007 includes the current reversal. The calibrate-able feature of the declutch ramp adds comfort to the release pulse during the motor declutch stage. The current level at which the reversed current is started is a calibrate-able sixth motor current level 1024. The duration 1010 of release pulse 1002 extends from the start of first motor current response period 1004 and extends until the completion of fourth motor current response period 1007.

Multiple power modes include a sleep mode, a low power mode, and a normal operation mode. The MSB control unit may enter a low current mode after the other vehicle modules are put to sleep. The low current mode provides the ability to stow seat belt 107 after the vehicle has been turned off for some period of time. The retraction is needed to prevent a limp seatbelt from being in the way of an occupant entering or exiting the vehicle. The low current mode also provides the capability to wake up and assist the occupant in stowing the seat belt 107, for example, when the occupant remains buckled for some period of time, the vehicle goes to full sleep, and the occupant then unbuckles the seat belt 107. As another scenario, an occupant extracts the belt as an attempt to buckle the seat belt 107, but changes their mind. As a result, MSB control system 120 preferably stows seat belt 107 even though there was no buckle transition to use as a wakeup signal. As a result, the low power mode itself provides a method of alerting MSB control system 120 to the potential for a stowage retraction. The low current mode may not actually stow seat belt 107. The awareness of belt movement provided by the low power mode brings the MSB control unit to its full-awake state. Once awake, the stowage retraction occurs.

The low power mode ends after a calibrate-able time period. An exemplary time period is ten minutes. After the time period, the MSB control unit enters full sleep mode if no activity is identified. Instead of timing the period, a microcomputer may update a counter periodically and determine the completion of the time period based on the counter equaling a specific value. For example, a counter may be updated each second. When the counter reaches 600 counts, a ten minute time period has expired. In order for the microcomputer to update a counter, a type of random access memory (RAM) or read only memory (ROM) may be used to maintain the counter. Preferably, RAM used to avoid wearing out the ROM due to continuous rewriting. As a result, the RAM of the microcomputer is always alive during the low power mode, which means that $V_{DD}$ power is always available. As known to those skilled in the art, other timer implementations may be employed.

Figure 11:
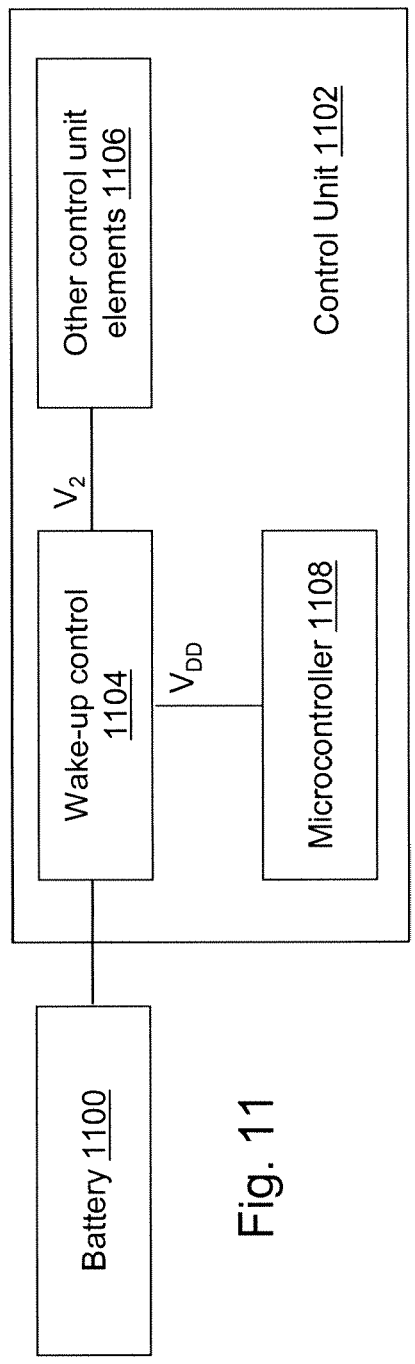
FIG. 11 is a block diagram illustrating functional components of a first exemplary low power mode.
Figure 12:
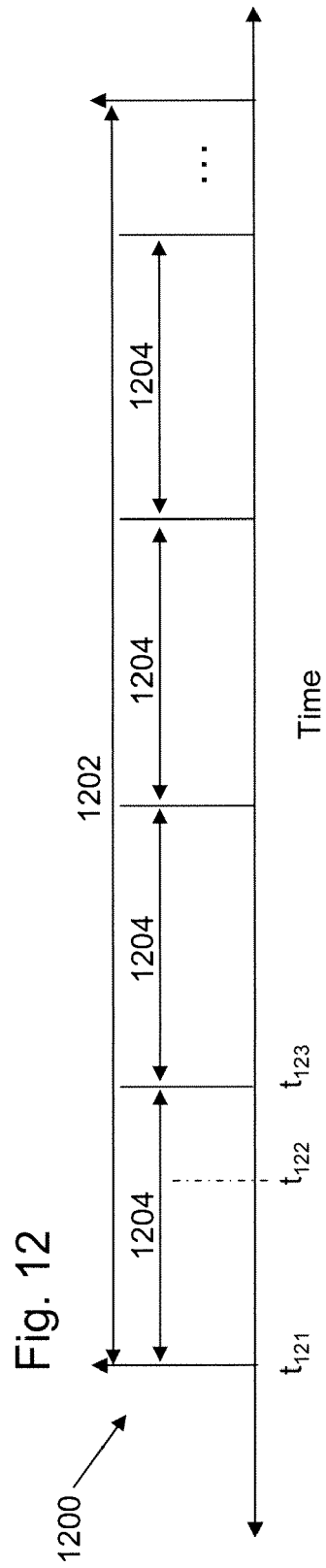
FIG. 12 illustrates a timing chart of the first exemplary low power mode.

With reference to FIG. 11, functional components of a first exemplary low power mode are shown. A battery 1100 provides power to a wake-up control 1104 of control unit 1102. A voltage $V_{DD}$=ON is provided to a microcomputer 1108 of control unit 1102. A voltage $V_2$=OFF is provided to other control unit elements 1106 when in the first exemplary low power mode. With reference to FIG. 12, microcomputer 1108 receives a command from MSB control system 120 to enter a stop mode at a first time $t_{121}$. In response, microcomputer 1108 enters a pseudo stop mode for a transition time period 1202 before entering the full sleep mode. During transition time period 1202, microcomputer 1108 enters stop mode from first time $t_{121}$ at which the command is received until a second time $t_{122}$ at which microcomputer 1108 wakes up and commands the remaining components of MSB control system 120 to wake-up. Until a third time $t_{123}$, microcomputer 1108 monitors the sensor edges using a standard software interface to identify any belt activity. A time period 1204 includes the time span from first time t121 to third time t123. A sequence of time periods 1204 is repeated until the transition time period 1202 expires. If no activity has occurred, full sleep mode is entered. This periodic sensing approach presents a periodic duration of time during which MSB control system 120 is unaware of belt movement.

With reference to FIG. 14, exemplary operations performed at microcomputer 1108 are shown. In an operation 1400, microcomputer 1108 receives a command to go to stop mode. In an operation 1402, a flag is set in memory indicating entry into the low power mode. In an operation 1404, a wake-up control monitor (watchdog timer) is disabled. In an operation 1406, the wake-up control is placed in stop mode. In an exemplary embodiment, VDD=ON and V2=OFF to place the wake-up control in stop mode. Microcomputer 1108 enters pseudo stop mode in an operation 1408. A wait period until second time $t_{122}$ occurs during an operation 1410. An exemplary second time $t_{122}$ is approximately 300 milliseconds (ms). In an operation 1412, microcomputer 1108 wakes up. In an operation 1414, microcomputer 1108 commands the remaining components of control unit 1102 to wake-up. In an operation 1416, microcomputer 1108 monitors for belt movement. In operation 1418, a determination of belt movement is performed. If belt movement is detected, processing continues at operation 1800, and MSB control system 120 remains in full wake-up mode. If belt movement is not detected, in operation 1420, a determination of whether or not transition time period 1202 has expired is performed. If transition time period 1202 has expired, MSB control system 120 enters full sleep mode in an operation 1422. If transition time period 1202 has not expired, processing continues at operation 1406.

Figure 13:
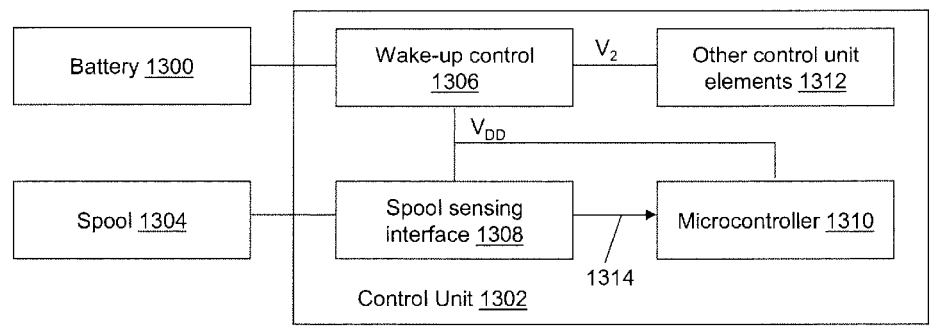
FIG. 13 is a block diagram illustrating functional components of a second exemplary low power mode.

With reference to FIG. 13, functional components of a second exemplary low power mode are shown. A battery 1300 provides power to a wake-up control 1306 of control unit 1302. A voltage VDD=ON is provided to a belt monitor sensing interface 1308 of control unit 1302. Belt monitor sensing interface 1308 receives belt movement information from belt monitor 1304. Voltage VDD=ON also is provided to microcomputer 1310 of control unit 1302. A voltage $V_2$=OFF is provided to other control unit elements 1312 when in the second exemplary low power mode.

Figure 15:
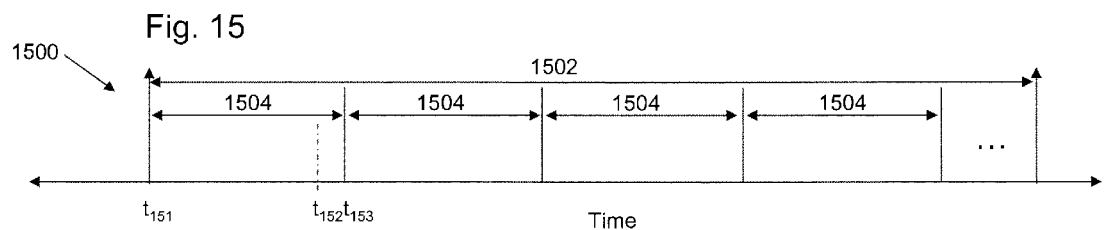
FIG. 15 illustrates a timing chart of the second exemplary low power mode.

With reference to FIG. 15, microcomputer 1310 receives a command from the MSB control system 120 to enter a stop mode at a first time $t_{151}$. In response, microcomputer 1108 enters a pseudo stop mode for a transition time period 1502 before entering the full sleep mode. During transition time period 1502, microcomputer 1108 enters the stop mode from first time $t_{151}$ at which the command is received until a second time $t_{152}$ at which microcomputer 1108 wakes up and serves the watch dog timer. Until a third time t153, microcomputer 1108 monitors the sensor edges using a standard software interface to identify any belt movement activity. A time period 1504 includes the time span from first time t151 to third time t153. A sequence of time periods 1504 is repeated until the transition time period 1502 expires. If no activity has occurred, full sleep mode is entered. Belt monitor sensing interface 1308 continuously monitors for belt movement. If movement is detected, an interrupt 1314 is sent to microcomputer 1310.

Figure 17:
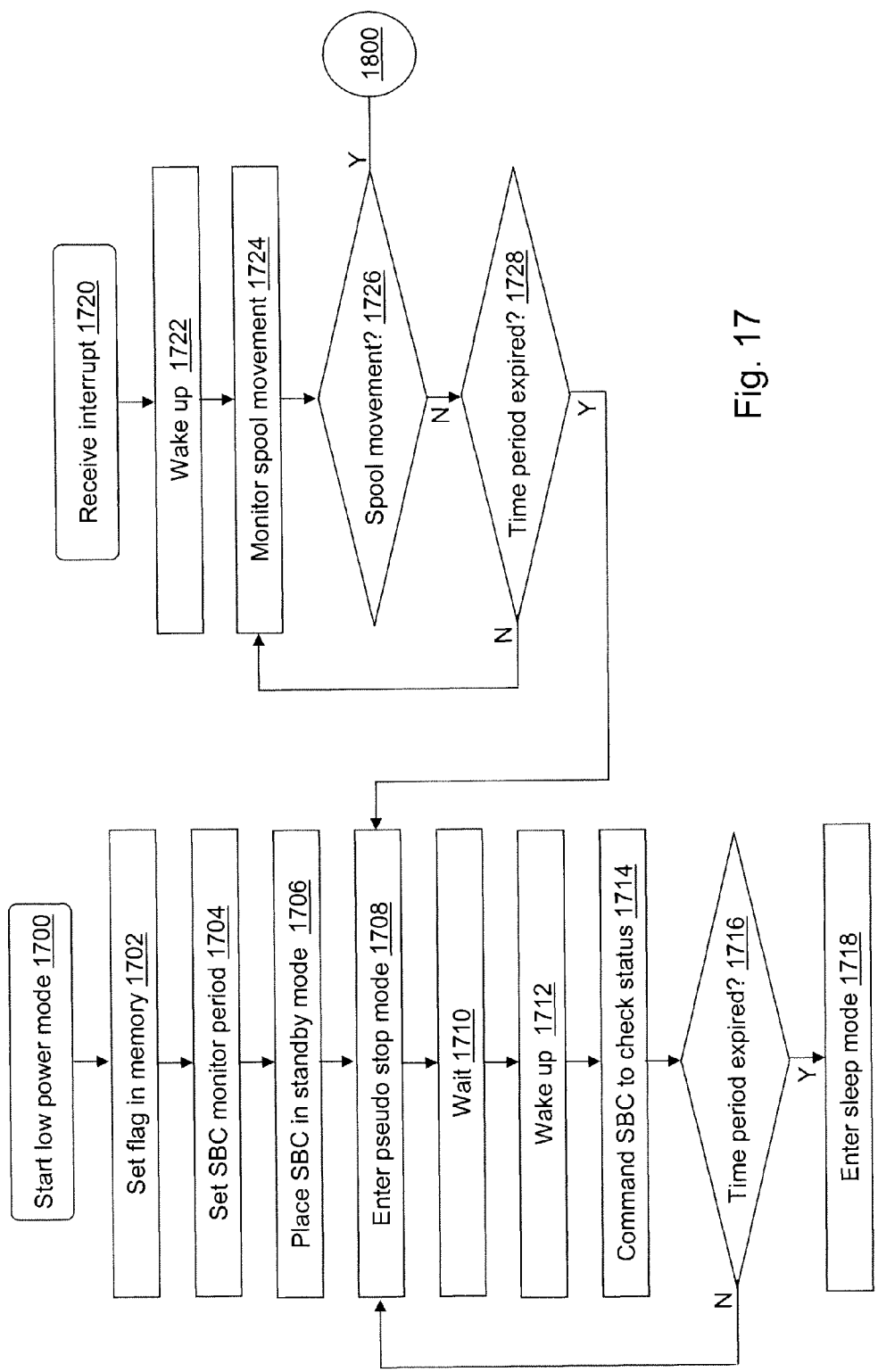
FIG. 17 is a flow diagram illustrating exemplary operations of the second exemplary low power mode in accordance with an exemplary embodiment.

With reference to FIG. 17, exemplary operations performed at control unit 1302 are shown. In an operation 1700, microcomputer 1310 receives a command to go to stop mode. In an operation 1702, a flag is set in memory indicating entry into the low power mode. In an operation 1704, the wake-up control monitor period is set. In an operation 1706, the wake-up control is placed in standby mode. In an exemplary embodiment, VDD=ON and V2=OFF to place the wake-up control in standby mode. Microcomputer 1310 enters pseudo stop mode in an operation 1708. A wait period until second time t152 occurs during an operation 1710. An exemplary second time t152 is approximately 350 ms. In an operation 1712, microcomputer 1310 wakes up and serves the watch dog timer before it expires. In an operation 1714, microcomputer 1108 commands the wake-up control to check the status of belt movement. In operation 1716, a determination of whether or not transition time period 1502 has expired is performed. If transition time period 1502 has expired, MSB control system 120 enters full sleep mode in an operation 1718. If transition time period 1502 has not expired, processing continues at operation 1708.

In an operation 1720, microcomputer 1108 receives an interrupt 1314 from belt monitor sensing interface 1308. In an operation 1722, microcomputer 1310 wakes up. In an operation 1724, microcomputer 1310 monitors for belt movement for a monitoring time period and services the watchdog timer. In operation 1726, a determination of belt movement is performed. If belt movement is detected, processing continues at operation 1800, and MSB control system 120 remains in full wake-up mode. If belt movement is not detected, in operation 1728, a determination of whether or not the monitoring time period has expired is performed. If the monitoring time period has expired, processing continues at operation 1708. If the monitoring time period has not expired, processing continues at operation 1724.

During the second exemplary low power mode, the wake-up control provides power to microcomputer 1310 and the belt movement sensing circuitry and shuts off power to the other control unit elements 1312. The belt monitor sensing interface 1308 interrupts the microcomputer 1310 when belt movement is detected based on detected movement of the edges. Microcomputer 1301 keeps track of the count of these edges after receiving the interrupt. Microcomputer 1301 continuously captures the number of edges resulting from any belt movement and triggers a transition into full awake mode once a specified number of edges have been captured. After the system is running in full awake mode, a stowage retraction may be performed. Using the second exemplary low power mode, there are no time periods during which the system is unaware of belt movement. Such an arrangement may increase the mode power requirements, however, over those of the first exemplary low power mode.

When buckled, the belt monitoring function defines a position A that indicates a "buckled park" position based on the belt movement sensor data. If the belt is buckled when the system wakes up, the buckled belt monitoring logic and thresholds are active. When unbuckled, the belt monitoring function defines a position E that indicates an "unbuckled park" position based on the sensor data. Thus, the state of seat belt 107 when the MSB system wakes up determines whether the buckled or unbuckled belt monitoring logic is active. If the belt is buckled when the system wakes up, seat belt 107 has not been unbuckled during the current wake period meaning that position E has not been defined for seat belt 107. Any transition from buckled to unbuckled uses stowage assist logic based on position A instead of position E. Positions A and E may be recorded in memory 302.

Figure 18:
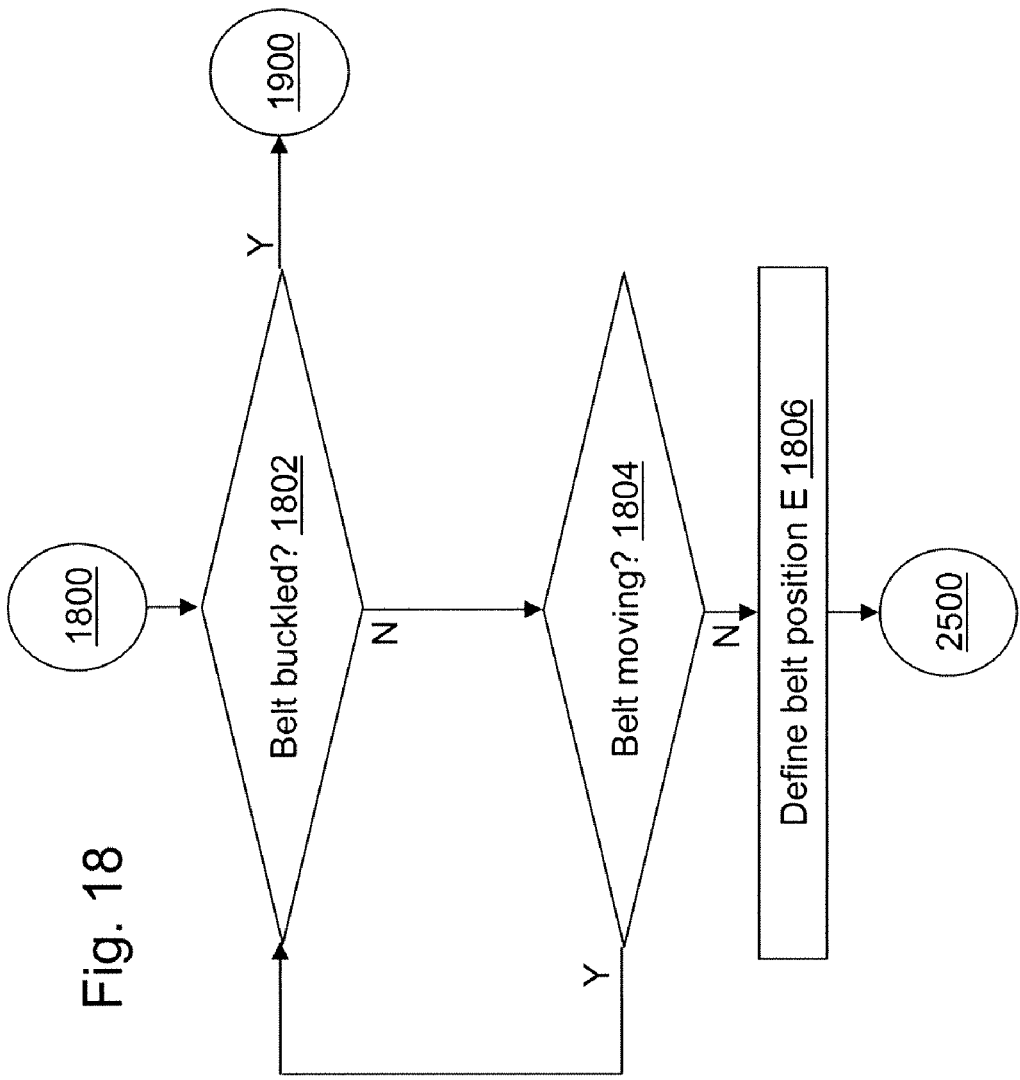
FIG. 18 is a flow diagram illustrating exemplary operations of the MSB control system at wake-up in accordance with an exemplary embodiment.

With reference to FIG. 18, belt monitoring logic is specified in terms of the buckle switch state. Wake-up of the MSB control system 120 occurs in an operation 1800. In an operation 1802, a determination is made as to whether or not tongue 114 is engaged with buckle 116. If tongue 114 is engaged with buckle 116, processing continues at operation 1900 for buckled belt monitoring. If tongue 114 is not engaged with buckle 116, a determination is made as to whether or not seat belt 107 is moving, in an operation 1804. If seat belt 107 is moving, processing continues at operation 1802. If seat belt 107 is not moving, belt position E is defined for an unbuckled position, and processing continues at operation 2500 for unbuckled belt monitoring.

The belt monitoring logic monitors events where the belt is retracted or extracted across a threshold that determines the action required of the MSB system 120. The retractions or extractions may or may not be motor controlled. Instead, the retractions may be caused by a retractor spring force and/or a manual assist from the seat occupant. Without these retraction sources, seat belt 107 may remain at the position to which seat belt 107 has been extracted. An unbuckled MSB system may not perform a stowage assist retraction.

Two scenarios for entering the buckled belt monitoring logic include: 1) entry at wake-up with the belt in a buckled state, and 2) a transition of the belt from a unbuckled state to an buckled state. The buckled belt monitoring is used to determine when an OOP warning mode or slack reduction mode is initiated. Slack reduction mode generally may be initiated in the following situations: 1) the belt becomes buckled when position A is not defined, for example, after MSB wakeup in unbuckled mode; 2) whenever a smaller position A is detected, for example, when a previous position A is not the actual buckled park position A; 3) when an occupant returns from leaning forward, but not far enough to have initiated the OOP warning mode. MSB system 120 waits for an occupant, who is leaning forward, to finish what they are doing and to return to an upright seated position before initiating a slack reduction.

With reference to FIG. 16, zones and thresholds used in the belt monitoring logic for a buckled seat belt are defined based on deltas from defined position A. Position A is defined based on a number of belt movement counts while the belt is buckled. Position A defines the smallest belt movement count when the belt is buckled with no slack in the belt. In reality, position A may or may not represent a no slack position. As a result, position A is updated each time upon completion of a slack reduction mode or any pull-back mode. Variation in position A exists based on occupant size, seat position, D-ring position, etc. Based on a determination of position A, five calibrate-able thresholds A−, A+, B, C, and D are defined. Threshold A− is the low threshold for a buckled park zone 1600 that includes the variation in position A. Threshold A+ is the high threshold for buckled park zone 1600 that includes the variation in position A. The difference between position A and threshold A− and A+ may be the same or different. Threshold B is a slack reduction trigger threshold defined for an occupant activity zone 1602. Occupant activity zone 1602 defines a zone of belt movement over which the passenger may move the seat belt without initiating an alert or warning or slack reduction. Threshold C is an extraction alert threshold that identifies the transition from occupant activity zone 1602 to an extraction alert zone 1604. Threshold D is a warning threshold that identifies the transition from extraction alert zone 1604 to a warning zone 1606. Belt movement across the thresholds triggers various response mechanisms of seat belt control algorithm 300.

Threshold A− defines the lower bound of buckled park zone 1600. Any spring force retraction across this threshold may start the slack reduction timer. Belt slack can be produced by the occupant moving the seat backward or adjusting the shoulder anchor 113 or tongue 114. Seat belt 107 may retract based on assistance from the occupant or retractor spring force alone. Threshold A+ defines the upper bound of buckled park zone 1600. Any retraction of the belt across threshold A+ indicates a return to the "buckled park" zone. Any slack reduction or warning timers active when threshold A+ is crossed are stopped, and the alert status of the system is cleared.

Threshold C defines the point of extraction that causes the belt monitoring function to be "alert" for potential MSB slack reduction and/or occupant warning scenarios that may be required. Extracting across this threshold alone may not start a retraction timer, but may be the first gate required in the logic leading to a slack reduction or warning pulse activation. Threshold D defines the point of belt extraction where a warning pulse timer starts. If the timer has been started, and the belt retracts across threshold D, the warning timer is stopped.

Threshold B provides a level of hysteresis between the point where the system becomes alert to the belt extraction and the point where the system decides to activate the slack reduction timer. The hysteresis supports cases where an occupant bends forward to perform some task and then returns to his originally seated position. The system prevents slack reduction attempts until the occupant has returned, or nearly returned, to his originally seated position thereby avoiding an annoyance to the occupant when he is consciously bending forward to perform a task. Retraction across threshold B after extraction across threshold C starts the slack reduction timer and extraction across threshold B stops the slack reduction timer.

With reference to FIG. 19, exemplary operations of a buckled belt monitoring algorithm are shown starting at an operation 1900. In an operation 1902, a determination insures that seat belt 107 remains in a buckled state. If seat belt 107 does not remain in a buckled state, processing continues at operation 2500. If seat belt 107 remains in a buckled state, an operation 1904 determines if belt position A is defined. If belt position A is not defined, processing continues at operation 1918. If belt position A is defined, an operation 1906 determines if seat belt 107 has retracted across threshold A−. If seat belt 107 has retracted across threshold A−, processing continues at operation 1918. If seat belt 107 has not retracted across threshold A−, an operation 1908 determines if seat belt 107 has extracted across threshold C. If seat belt 107 has not extracted across threshold C, processing continues at operation 1904. If seat belt 107 has extracted across threshold C, an operation 1910 determines if seat belt 107 has retracted across threshold A−. If seat belt 107 has retracted across threshold A−, processing continues at operation 1918. If seat belt 107 has not retracted across threshold A−, an operation 1912 determines if seat belt 107 has retracted across threshold A+. If seat belt 107 has retracted across threshold A+, processing continues at operation 1904. If seat belt 107 has not retracted across threshold A+, an operation 1914 determines if seat belt 107 has extracted across threshold D. If seat belt 107 has extracted across threshold D, processing continues at operation 1938. If seat belt 107 has not extracted across threshold D, an operation 1912 determines if seat belt 107 has retracted across threshold B. If seat belt 107 has not retracted across threshold B, processing continues at an operation 1942. If seat belt 107 has retracted across threshold B, processing continues at operation 1918.

In operation 1918, a slack reduction timer is started and processing continues at operation 1920. Operation 1920 determines if belt position A is defined. If belt position A is not defined, processing continues at operation 1930. If belt position A is defined, an operation 1922 determines if seat belt 107 has retracted across threshold A−. If seat belt 107 has retracted across threshold A−, processing continues at operation 1930. If seat belt 107 has not retracted across threshold A−, an operation 1924 determines if seat belt 107 has retracted across threshold A+. If seat belt 107 has extracted across threshold A+, processing continues at operation 1932. If seat belt 107 has not retracted across threshold A+, an operation 1926 determines if seat belt 107 has extracted across threshold D. If seat belt 107 has extracted across threshold D, processing continues at operation 1932. If seat belt 107 has not extracted across threshold D, an operation 1928 determines if seat belt 107 has extracted across threshold B. If seat belt 107 has extracted across threshold B, processing continues at operation 1936. If seat belt 107 has not extracted across threshold B, an operation 1930 determines if the slack reduction timer has expired. If the slack reduction timer has expired, processing continues at operation 2200 to attempt to reduce the slack in seat belt 107. If the slack reduction timer has not expired, processing continues at operation 1920.

In an operation 1932, the slack reduction timer is stopped and processing continues at operation 1904. In an operation 1936, the slack reduction timer is stopped and processing continues at operation 1942. In an operation 1942, a warning timer is stopped. In an operation 1938, a warning timer is started and processing continues at operation 1940. An operation 1940 determines if seat belt 107 has extracted across threshold D. If seat belt 107 has not extracted across threshold D, processing continues at operation 1942. If seat belt 107 has extracted across threshold D, an operation 1944 determines if a warning timer has expired. If the warning timer has expired, in an operation 1946, a haptic warning may be initiated. If the warning timer has not expired, processing continues at operation 1940.

A slack reduction attempt may result in the belt being stopped before it has been retracted to its currently defined buckled park position A. This may be caused by obstruction from any part of the occupant, or any object the occupant may be handling. A calibrate-able number of retry attempts to return the belt to its buckled park position A may be performed. In an exemplary embodiment, a retry counter is selectable between zero and three. With reference to FIG. 22, exemplary operations of a buckled belt slack reduction algorithm are shown starting at an operation 2200. In an operation 2201, motor 310 is sent a command to retract seat belt 107 to reduce any slack that may exist based on seat occupant movement. An operation 2202 determines if retraction of seat belt 107 is complete. If retraction of seat belt 107 is not complete, processing continues at operation 2201. If retraction of seat belt 107 is complete, an operation 2204 determines if seat belt 107 has retracted across threshold A+. If seat belt 107 has retracted across threshold A+, processing continues at operation 2210. If seat belt 107 has not retracted across threshold A+, an operation 2206 determines if a retry counter is zero. If the retry counter is zero, processing continues at operation 2210. If the retry counter is not zero, the retry counter is decremented in an operation 2208 and processing continues at operation 2201. In operation 2210, belt position A is updated and processing continues at operation 2212. In operation 2212, thresholds A−, A+, B, C, and D are updated relative to position A and processing continues at operation 2214. In operation 2214, the retry counter is re-set to a specified pre-defined value. Thus, position A is updated to reflect belt position changes due to an occupant moving the seat backwards/forwards, adjusting a belt shoulder anchor, holding/removing a bag, putting on/taking off coat, etc.

With reference to FIG. 20, a first exemplary sequence of movement of the seat belt relative to the monitoring zones of FIG. 16 is shown for illustration of the exemplary operations of the buckled belt monitoring algorithm and of the buckled belt slack reduction algorithm. Seat belt 107 is extracted across thresholds A+, B, and C. At a first trigger time $t_{201}$, a system alert occurs upon extraction across threshold C. Subsequently, seat belt 107 is retracted across thresholds C and B. At a second trigger time $t_{202}$, a slack reduction timer is started upon retraction across threshold B. Subsequently, seat belt 107 is retracted across threshold A+ at a third trigger time $t_{203}$. At third trigger time $t_{203}$, the slack reduction timer is stopped, and the system alert is cleared.

With reference to FIG. 21, a second exemplary sequence of movement of the seat belt relative to the monitoring zones of FIG. 16 is shown for further illustration of the exemplary operations of the buckled belt monitoring algorithm and of the buckled belt slack reduction algorithm. Seat belt 107 is extracted across thresholds A+, B, and C. At a first trigger time $t_{211}$, a system alert occurs upon extraction across threshold C. Subsequently, seat belt 107 is retracted across thresholds C and B. At a second trigger time $t_{212}$, a slack reduction timer is started upon retraction across threshold B. Subsequently, seat belt 107 is extracted across threshold B, at a third trigger time $t_{213}$, without retraction across threshold A+. At third trigger time $t_{213}$, the slack reduction timer is stopped because the occupant is not returning to the buckled park zone, but the system remains alerted. Subsequently, seat belt 107 is retracted across threshold B, at a fourth trigger time $t_{214}$, and the slack reduction timer is restarted.

With reference to FIG. 23, a third exemplary sequence of movement of the seat belt relative to the monitoring zones of FIG. 16 is shown for further illustration of the exemplary operations of the buckled belt monitoring algorithm and of the buckled belt slack reduction algorithm. Seat belt 107 is extracted across thresholds A+ and B. Subsequently, seat belt 107 is retracted across threshold B. The slack reduction timer is not started because the system is not in an alert state because threshold C was not crossed. MSB system 120 remains in occupant activity zone 1602.

Figure 24:
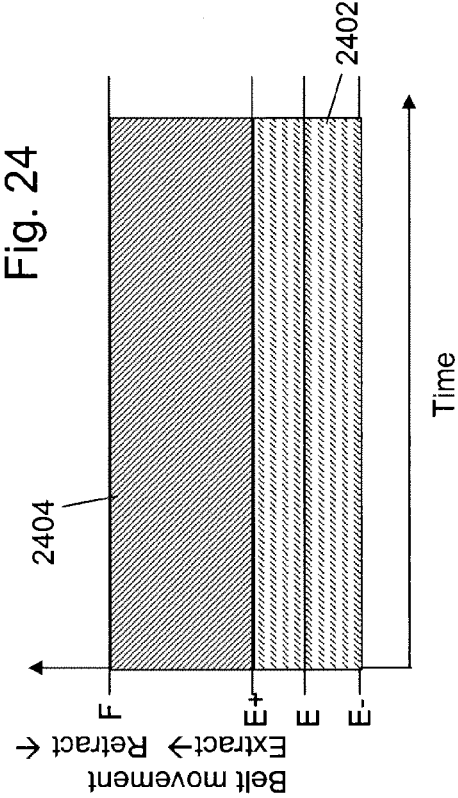
FIG. 24 illustrates monitoring zones of movement of a seat belt unbuckled at wake-up of the MSB control system in accordance with an exemplary embodiment.

Unbuckled belt monitoring is used to determine when a stowage assist retraction is initiated by the MSB control system 120. Two scenarios for entering the unbuckled belt monitoring logic 2500 are 1) entry at wake-up as shown with reference to FIG. 18, and 2) a transition of the belt from a buckled state to an unbuckled state as shown with reference to FIG. 19. With reference to FIG. 24, zones and thresholds used in the belt monitoring logic for an unbuckled seat belt are defined based on deltas from defined position E. Position E is defined based on a number of belt movement counts while the belt is unbuckled and not moving. Based on a determination of position E, three calibrate-able thresholds E−, E+, and F are defined. Threshold E− is the low threshold for an unbuckled park zone 2402 that includes a variation in position E. Retraction across threshold E− indicates that the current position E value is not the position where the belt is fully retracted. Retracting across threshold E− starts a stowage assist timer. Threshold E+ is the high threshold for an unbuckled park zone 2402 that includes a variation in position E. Retraction across threshold E+ indicates that the belt has returned to unbuckled park zone 2402. As a result, the stowage assist timer is stopped and reset. Threshold F defines a transition position retraction that defines an upper bound for an assist from unbuckled zone 2404. Retraction across threshold F triggers the start of the stowage assist timer.

Unbuckled park position E is used to define the position of seat belt 107 when it is fully retracted. Unbuckled park position E may also represent anywhere between shoulder anchor 113 and buckle 116. As a result, the value of position E is updated based on sensor data taken when an MSB stowage retraction comes to a stop. If seat belt 107 is unbuckled at wake-up, and determined not to be moving, the current belt position is defined as position E.

Figure 26:
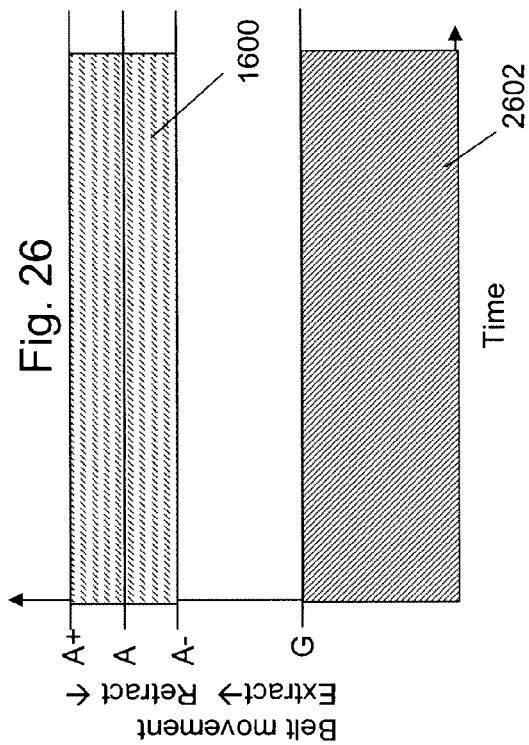
FIG. 26 illustrates monitoring zones of movement of a seat belt of the MSB control system, wherein the seat belt is buckled at wake-up and subsequently unbuckled, in accordance with an exemplary embodiment.

With reference to FIG. 26, zones and thresholds used in the belt monitoring logic for an unbuckled seat belt when the belt is buckled at wake-up are defined based on a delta from defined position A. Based on a determination of position A, one additional calibrate-able threshold G is defined. A stowage assist mode may be initiated in a number of situations. First, the stowage assist mode may be initiated when the belt becomes unbuckled when unbuckled park position E is not yet defined, for example, when the MSB wakesup in buckled mode. Spring force retracts the belt a pre-defined distance G counts from buckled park position A. Afterwards, MSB system 120 initiates stowage assist mode. The parameter G is used to generate a no activity zone immediately after unbuckled, to support a situation such as an occupant unbuckling the belt, but holding it without letting the belt go. In this case, the stowage assist mode starts when the belt is G counts away from buckled park position A to prevent stowage assist mode pulling the buckle from the occupant's hands upon unbuckled state change. Second, the stowage assist mode may be initiated when the belt becomes unbuckled and unbuckled park position E is defined. Spring force retracts the belt a pre-defined distance F counts from unbuckled park position E.

Afterwards, MSB system 120 initiates stowage assist mode. Position F is used to make sure the occupant is ready for the belt to be retracted, but because the unbuckled park position E is already defined, F also is defined and is used instead of G. Position F and position G may or may not be the same value. Third, the stowage assist mode may be initiated whenever a smaller unbuckled park position E is detected to provide for resetting of position E.

Figure 25:
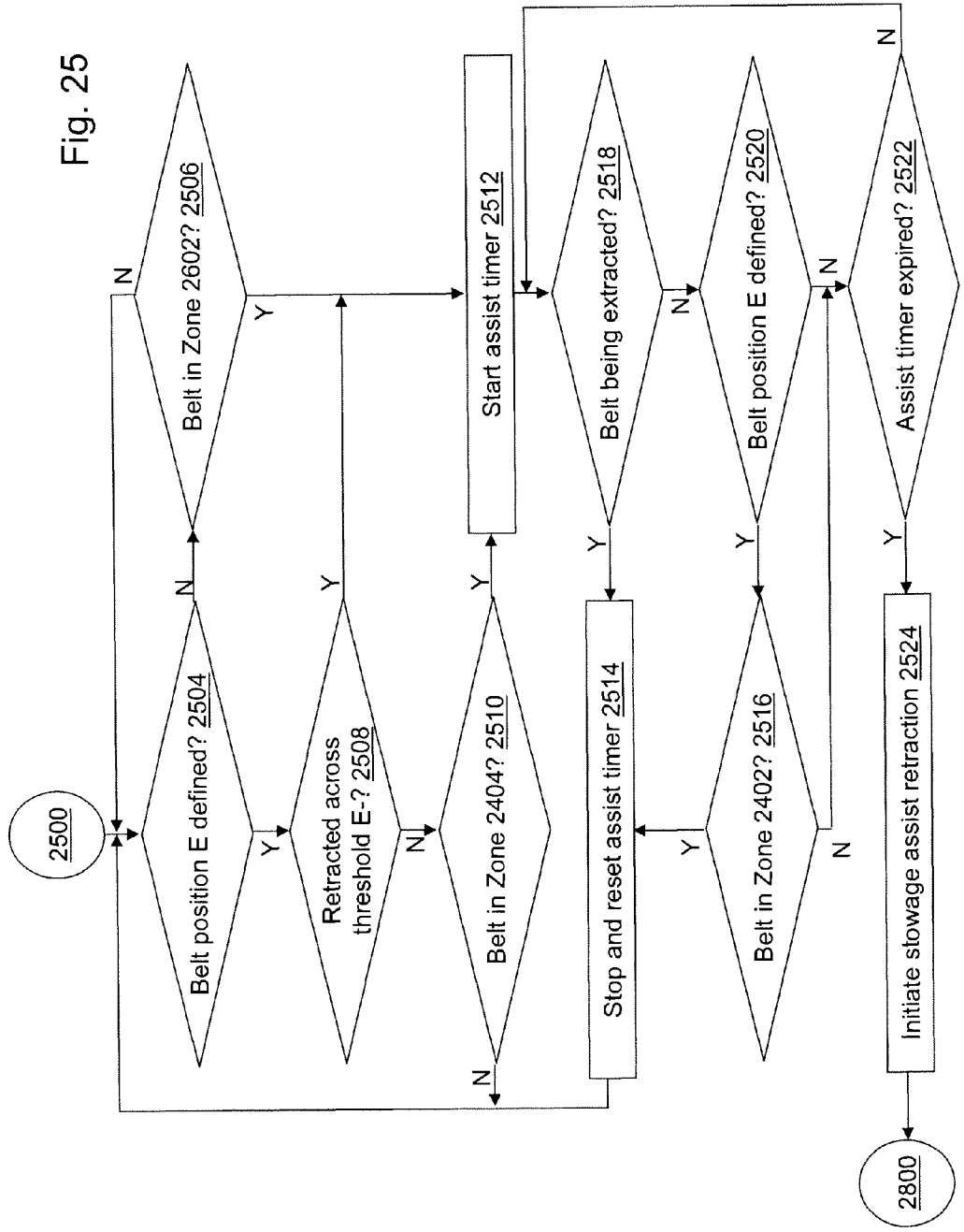
FIG. 25 is a flow diagram illustrating exemplary operations in monitoring an unbuckled seat belt of the MSB control system in accordance with an exemplary embodiment.

With reference to FIG. 25, exemplary operations of an unbuckled belt monitoring algorithm are shown starting at an operation 2500. An operation 2504 determines if belt position E is defined. If belt position E is not defined, processing continues at operation 2506. If belt position E is defined, an operation 2508 determines if seat belt 107 has retracted across threshold E–. If seat belt 107 has retracted across threshold E–, processing continues at operation 2512. If seat belt 107 has not retracted across threshold E–, an operation 2510 determines if seat belt 107 is currently within assist from unbuckled zone 2404. If seat belt 107 is not currently within assist from unbuckled zone 2404, processing continues at operation 2504. If seat belt 107 is currently within assist from unbuckled zone 2404, processing continues at operation 2512. Assist from unbuckled zone 2404 allows for a no activity zone to exist when the belt is extracted across threshold F and prevents the stowage retraction from attempting to pull the belt out of the occupant's hand when the buckle process has not been completed.

Operation 2506 determines if seat belt 107 is currently within assist from buckled zone 2602. If seat belt 107 is not currently within assist from buckled zone 2602, processing continues at operation 2504. If seat belt 107 is currently within assist from buckled zone 2602, processing continues at operation 2512. In operation 2512, an assist timer is started and processing continues in an operation 2518. Operation 2518 determines if seat belt 107 is being extracted. If seat belt 107 is being extracted, processing continues at operation 2514. If seat belt 107 is not being extracted, an operation 2520 determines if belt position E is defined. If belt position E is defined, an operation 2516 determines if seat belt 107 is currently within unbuckled park zone 2402. If seat belt 107 is currently within unbuckled park zone 2402, processing continues at operation 2514. If seat belt 107 is not currently within unbuckled park zone 2402, processing continues at operation 2522. If belt position E is not defined, processing continues at operation 2522. Operation 2522 determines if the assist timer has expired. If the assist timer has not expired, processing continues at operation 2518. If the assist timer has expired, processing continues at operation 2524. In operation 2524, a stowage assist retraction is initiated and processing continues at operation 2800. In an operation 2514, the assist timer is stopped and reset and processing continues at operation 2504.

Figure 27:
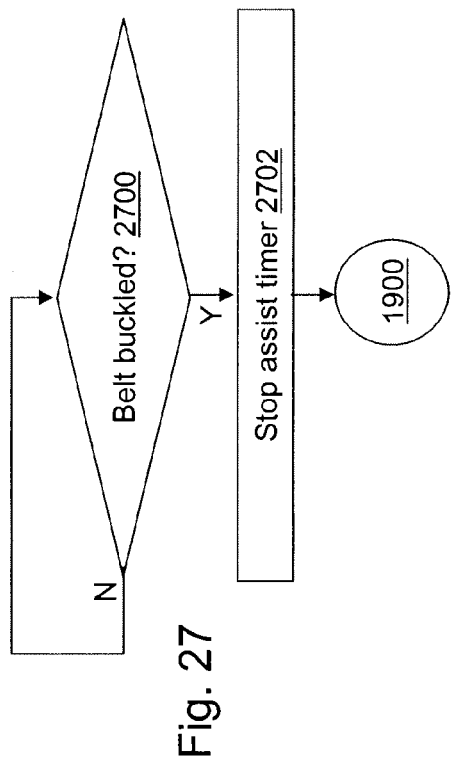
FIG. 27 is a flow diagram illustrating exemplary operations in monitoring a seat belt status of the MSB control system in accordance with an exemplary embodiment.

With reference to FIG. 27, a buckled state is continuously monitored by MSB control system 120 when the unbuckled state is defined to identify if a passenger engages tongue 114 with buckle 116. Additionally, an unbuckled state is continuously monitored by MSB control system 120 when the buckled state is defined to identify if a passenger disengages tongue 114 from buckle 116. An operation 2700 determines if seat belt 107 is buckled. If seat belt 107 is not buckled, processing continues at operation 2700 to continue monitoring. If seat belt 107 is buckled, the assist timer is stopped in an operation 2702 and processing continues at operation 1900 to initiate buckled belt monitoring.

With reference to FIG. 28, exemplary operations of a stowage assist algorithm are shown starting at an operation 2800. In an operation 2801, motor 310 is sent a command to retract seat belt 107 to assist in stowage of seat belt 107. Processing continues at operation 2802. Operation 2802 determines if belt position E is defined. If belt position E is not defined, processing continues at operation 2814. If belt position E is defined, an operation 2804 determines if retraction of seat belt 107 is complete. If retraction of seat belt 107 is not complete, processing continues at operation 2804. If retraction of seat belt 107 is complete, an operation 2806 determines if seat belt 107 has retracted across threshold E+. If seat belt 107 has retracted across threshold E+, processing continues at operation 2814. If seat belt 107 has not retracted across threshold E+, an operation 2808 determines if a retry counter is zero. In an exemplary embodiment, a retry counter is selectable between zero and three. If the retry counter is zero, processing continues at operation 2814. If the retry counter is not zero, the retry counter is decremented in an operation 2810, and processing continues at operation 2801. In operation 2814, belt position E is updated, and processing continues at operation 2816. In operation 2816, thresholds E–, E+, and F are defined relative to position E, and processing continues at operation 2818. In operation 2818, the retry counter is re-set to a specified pre-defined value.

A change in belt direction from retraction to extraction after the stowage assist timer is started may cause the timer to be stopped and reset. Such a change in direction indicates that the occupant is attempting to extract more belt after the belt monitoring logic has determined that a stowage retraction situation exists. In this case, the stowage retraction is aborted.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, although the safety restraint system has been described with reference to a continuous loop three-point safety restraint system having a single seat belt retractor, the concepts are equally applicable to a three-point safety restraint system having dual retractors, to a two point safety restraint system having only a lap belt or a shoulder belt, to a four-point safety restraint, etc. Additionally, though the safety restraint system has been described with reference to a passenger car, the concepts are applicable to any type of vehicle and to any type of seat whether mounted in a vehicle or not. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

The invention claimed is:
1. A seat belt system, the system comprising:
a buckle;
a seat belt including a tongue, wherein the tongue is capable of engaging with the buckle;
a retractor, wherein the retractor is capable of retracting the seat belt under control of an actuator; and
a controller capable of communicating with the actuator to control movement of the seat belt, wherein the controller is configured
(a) to determine a buckle status of the seat belt;
(b) if the determined buckle status is buckled, to define a buckled value based on a first position of the seat belt;
(c) to define a plurality of thresholds based on the defined buckled value;

(d) to monitor movement of the seat belt to determine a seat belt position;
(e) to compare the determined seat belt position to the plurality of thresholds; and
(f) to perform an action based on the comparison of (e).

2. A method of controlling a seat belt, the method comprising:
(a) determining a buckle status of a seat belt;
(b) if the determined buckle status is buckled, defining a buckled value based on a first position of the seat belt;
(c) defining a plurality of thresholds based on the defined buckled value;
(d) monitoring movement of the seat belt to determine a seat belt position;
(e) comparing the determined seat belt position to the plurality of thresholds; and
(f) performing an action based on the comparison of (e).

3. The method of claim 2, wherein the action is at least one of stowing the seat belt, sending a warning to a seat occupant, and reducing a slack in the seat belt.

4. The method of claim 2, further comprising:
(g) attempting to reduce a slack in the seat belt;
(h) determining a first seat belt position after (g);
(i) comparing the determined first seat belt position to a first threshold, wherein the first threshold is defined as the buckled value plus an extraction value;
(j) if the determined first seat belt position is less than the first threshold, replacing the defined buckled value with the determined first seat belt position; and
(k) re-defining the plurality of thresholds based on the replaced buckled value.

5. The method of claim 4, further comprising:
(l) if the determined first seat belt position is greater than the first threshold, repeating (g)-(k).

6. The method of claim 5, further comprising:
(m) repeating (l) a predetermined number of times unless the determined first seat belt position is less than the first threshold; and
(n) if the determined first seat belt position is greater than the first threshold after (m), replacing the defined buckled value with the determined first seat belt position.

7. The method of claim 2, wherein the plurality of thresholds comprises a first threshold, wherein the first threshold is defined as the buckled value plus an extraction value, and further wherein an extraction of the seat belt across the first threshold starts a warning pulse timer.

8. The method of claim 7, wherein a retraction of the seat belt across the first threshold stops the warning pulse timer.

9. The method of claim 7, further comprising, after expiration of the warning pulse timer, initiating a haptic warning to a user of the seat belt.

10. The method of claim 2, wherein the plurality of thresholds comprises a first threshold, wherein the first threshold is defined as the buckled value plus an extraction value, and further wherein a retraction of the seat belt across the first threshold starts a slack reduction timer.

* * * * *